United States Patent
Vezina et al.

(10) Patent No.: US 9,051,027 B1
(45) Date of Patent: Jun. 9, 2015

(54) VEHICLE HAVING AN INERTIA WHEEL

(71) Applicant: BOMBARDIER RECREATIONAL PRODUCTS INC., Valcourt (CA)

(72) Inventors: Sebastien Vezina, Sherbrooke (CA); Jonathan Fortier, Lawrenceville (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/093,311

(22) Filed: Nov. 29, 2013

Related U.S. Application Data

(60) Provisional application No. 61/731,859, filed on Nov. 30, 2012.

(51) Int. Cl.
*B62M 27/02* (2006.01)

(52) U.S. Cl.
CPC ..................................... *B62M 27/02* (2013.01)

(58) Field of Classification Search
USPC ........................................................ 180/190
See application file for complete search history.

(56) References Cited

U.S. PATENT DOCUMENTS

| | | | |
|---|---|---|---|
| 2,960,058 A * | 11/1960 | Magnani | 440/30 |
| 3,734,222 A * | 5/1973 | Bardwick, III | 180/165 |
| 5,314,034 A | 5/1994 | Chittal | |
| 6,360,838 B1 | 3/2002 | Kulhavy | |
| 6,626,258 B1 | 9/2003 | Forbes | |
| 7,648,148 B1 | 1/2010 | Mercier | |
| 2007/0176384 A1 | 8/2007 | Brudeli | |
| 2010/0140007 A1 | 6/2010 | Ogura et al. | |
| 2012/0298437 A1 | 11/2012 | Dietz | |

* cited by examiner

*Primary Examiner* — Kevin Hurley
*Assistant Examiner* — Michael Stabley
(74) *Attorney, Agent, or Firm* — BCF LLP

(57) ABSTRACT

A vehicle has a frame, a straddle seat, a motor, a belt transmission system, front left and right suspension assemblies, front left and right ground engaging members, a rear suspension assembly, a rear ground engaging member, a steering assembly operatively connected to the front left and right ground engaging members and having a handlebar, and an inertia wheel. The inertia wheel is operatively connected to the steering assembly. The inertia wheel pivots about a generally vertical axis when the handlebar is turned to steer the front left and right ground engaging members. The inertia wheel pivots about the vertical axis in a same direction as the front left and right ground engaging members when steered by the handlebar.

20 Claims, 19 Drawing Sheets

VEHICLE HAVING AN INERTIA WHEEL

CROSS REFERENCE

The present application claims priority to U.S. Provisional Patent Application No. 61/731,859, filed Nov. 30, 2012, the entirety of which is incorporated herein by reference.

TECHNICAL FIELD

The present application relates to vehicles with inertia wheels.

BACKGROUND

Typically, snowmobiles have two front skis connected to a handlebar and a rear endless track connected to an engine to propel the snowmobile. In such typical snowmobiles, the snowmobile is steered by turning the handlebar in the direction in which the driver wants to turn. This is known as steer-in-direction. During a turn, the suspension assembly connected to the ski on the outside of the turn is compressed, causing the snowmobile to roll slightly toward the outside of the turn, which the driver can compensate by leaning toward the inside of the turn.

In other vehicles, such as motorcycles, the vehicle is steered by what is known by countersteering. In a motorcycle for example, the motorcycle turns by leaning in the direction of the turn. To achieve this leaning, the driver momentarily turns the handlebar in the direction opposite to the direction of the turn (i.e. the driver countersteers).

Driving a vehicle that can lean into a turn offers a much different driving experience than driving a vehicle that is steer-in-direction. It would be desirable to at least some drivers to have the driving experience of a leaning vehicle on a vehicle having three ground engaging members such as a snowmobile.

U.S. Pat. No. 7,648,148 B1, issued Jan. 19, 2010, and United States Patent Publication No. 2007/0176384 A1, published Aug. 2, 2007, the entirety of both of which is incorporated herein by reference, describe three-wheel vehicles that can lean in a turn. In vehicles of this type, the frame of the vehicle is pivotally connected to a shock tower (also known as a transfer frame) and the front shock absorbers associated with the two front wheels are connected at their upper end to the shock tower. During a turn, the frame pivots into the turn like on a motorcycle, but the shock tower remains essentially vertical. As a result, the front shock absorbers do not get compressed due to the leaning of the frame.

Leaning of such vehicles having three ground engaging member can be achieved in two ways. The first is assisted leaning in which an actuator actively pivots the frame relative to the shock tower based on signals received from one or more sensors on the vehicle, some examples of which are provided in U.S. Pat. No. 7,648,148 B1. The second is unassisted leaning, in which the pivoting of the frame relative to the shock tower is the result of the countersteering effected by the driver and the balancing of the forces acting on the vehicle during the turn.

One of the advantages of unassisted leaning over assisted leaning is that a vehicle with unassisted leaning is mechanically and electronically less complex than an assisted leaning vehicle as it does not require an actuator, its associated components, sensors and an electronic control system to control the actuator based on the signals from the sensors. However, one of the advantages of assisted leaning over unassisted leaning is that the actuator can be used to assist to initiate leaning of the frame relative to the shock tower and to return the frame in the upright position.

Also, unassisted leaning vehicles rely on the friction between the ground and the ground engaging members in order to achieve leaning of the vehicle and for returning the vehicle to the upright position. Therefore, when the vehicle operates on a low friction ground surface, such as ice or snow, the friction between the ground and the ground engaging member may be insufficient to prevent the ground engaging members from sliding sideways which may lead to the vehicle tipping over or understeering.

As such, there is a need for a system for complementing the torques generated when countersteering in order to lean a frame of an unassisted leaning vehicle having at least three ground engaging members and to return the frame to an upright position.

SUMMARY

One object of the present invention is to ameliorate at least some of the inconveniences of the prior art.

In one aspect, a vehicle has a frame having a front portion and a rear portion, a straddle seat mounted on the frame, a motor supported by the frame, a belt transmission system operatively connected to and driven by the motor, a front left suspension assembly and a front right suspension assembly operatively connected to the front portion of the frame, a front left ground engaging member operatively connected to the front left suspension assembly, a front right ground engaging member operatively connected to the front right suspension assembly, a rear suspension assembly connected to the rear portion of the frame, and a rear ground engaging member operatively connected to the rear suspension assembly. At least one of the ground engaging members is driven by the belt transmission system. A steering assembly operatively is connected to the front left ground engaging member and the front right ground engaging member to steer the vehicle. The steering assembly has a steering column supported by the frame and a handlebar connected to the steering column. An inertia wheel is operatively connected to the steering assembly. The inertia wheel pivots about a generally vertical axis when the handlebar is turned to steer the front left and right ground engaging members. The inertia wheel pivots about the vertical axis in a same direction as the front left and right ground engaging members when steered by the handlebar.

In an additional aspect, a link operatively connects the steering column to the inertia wheel.

In a further aspect, the link is operatively connected at a first end to the steering column about a first point that is offset from a steering column axis defined by the steering column. The link is operatively connected at a second end to the inertia wheel about a second point that is offset from the vertical axis.

In an additional aspect, the link has a first end and a second end. The first end of the link is operatively connected to the steering column about a first point that is offset from a steering column axis defined by the steering column. The second end of the link is operatively connected to the inertia wheel about a second point that is offset from the vertical axis. A joint is operatively connected to the belt transmission system. An axle connects the joint to the inertia wheel. A gimbal rotationally supports the axle and the joint therein. The gimbal is pivotable about the vertical axis together with the inertia wheel. The gimbal is connected to the second end of the link.

In a further aspect, the inertia wheel and the rear ground engaging member rotate in a same direction when the vehicle is in operation.

In an additional aspect, the frame is pivotable about a longitudinally extending pivot axis. A center of the inertia wheel is vertically higher than the pivot axis at least when the vehicle is in an upright position.

In a further aspect, a shock tower is pivotally connected to the front portion of the frame. The frame is pivotable relative to the shock tower about a pivot axis between an upright position and a plurality of leaning positions. Each of the front left suspension assembly and the front right suspension assembly includes a shock absorber connected at one end to the shock tower.

In an additional aspect, a laterally extending countershaft is operatively connected to and driven by the belt transmission system. A reduction is drive operatively connected to and driven by the countershaft. The inertia wheel rotates about an inertia wheel axis and the countershaft rotates about a countershaft axis. The inertia wheel axis and the countershaft axis are coaxial when the vehicle is steered in a straight ahead direction.

In a further aspect, the vertical axis is disposed in a vertical plane containing a longitudinal centerline of the vehicle when the vehicle is steered in a straight ahead direction.

In an additional aspect, the vehicle is a snowmobile. The rear portion of the frame includes a tunnel. The front left ground engaging member is a left ski. The front right ground engaging member is a right ski. The rear ground engaging member is an endless track disposed at least in part under the tunnel.

In a further aspect, the endless drive track has a generally arcuate lateral profile.

In an additional aspect, an electric motor is operatively connected to the inertia wheel and drives the inertia wheel.

In a further aspect, the inertial wheel is operatively connected to and driven by the belt transmission system.

For purposes of this application, terms related to spatial orientation such as forwardly, rearwardly, upwardly, downwardly, left, and right, are as they would normally be understood by a driver of the vehicle sitting thereon in a normal riding position. Also, the term "ground engaging member" refers to a component of a vehicle making contact with the ground to permit displacement of the vehicle over the ground. Examples of ground engaging members include, but are not limited to, skis, wheels and endless tracks. The definitions of terms in the present application take precedence over the definitions of the same terms in documents incorporated herein by reference.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

A leaning snowmobile 10 will be described below. It should be understood that aspects of the leaning snowmobile 10 could be applied to other types of leaning vehicles having three or more ground engaging members such as, but not limited to, a three-wheeled vehicle having left and right front wheels and one laterally centered rear wheel.

Figure 1:
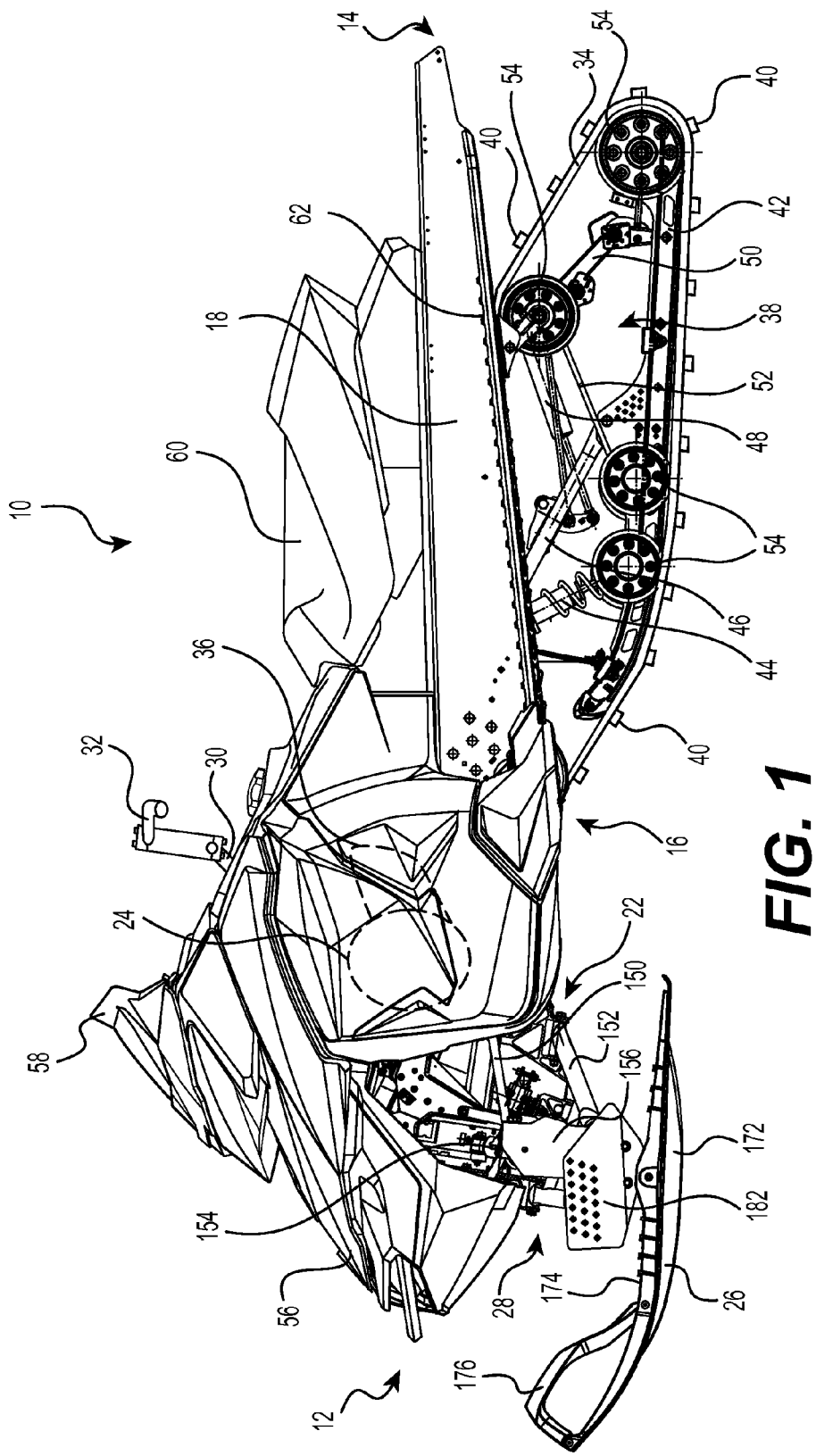
FIG. 1 is a left side elevation view of a leaning snowmobile.
Figure 2:
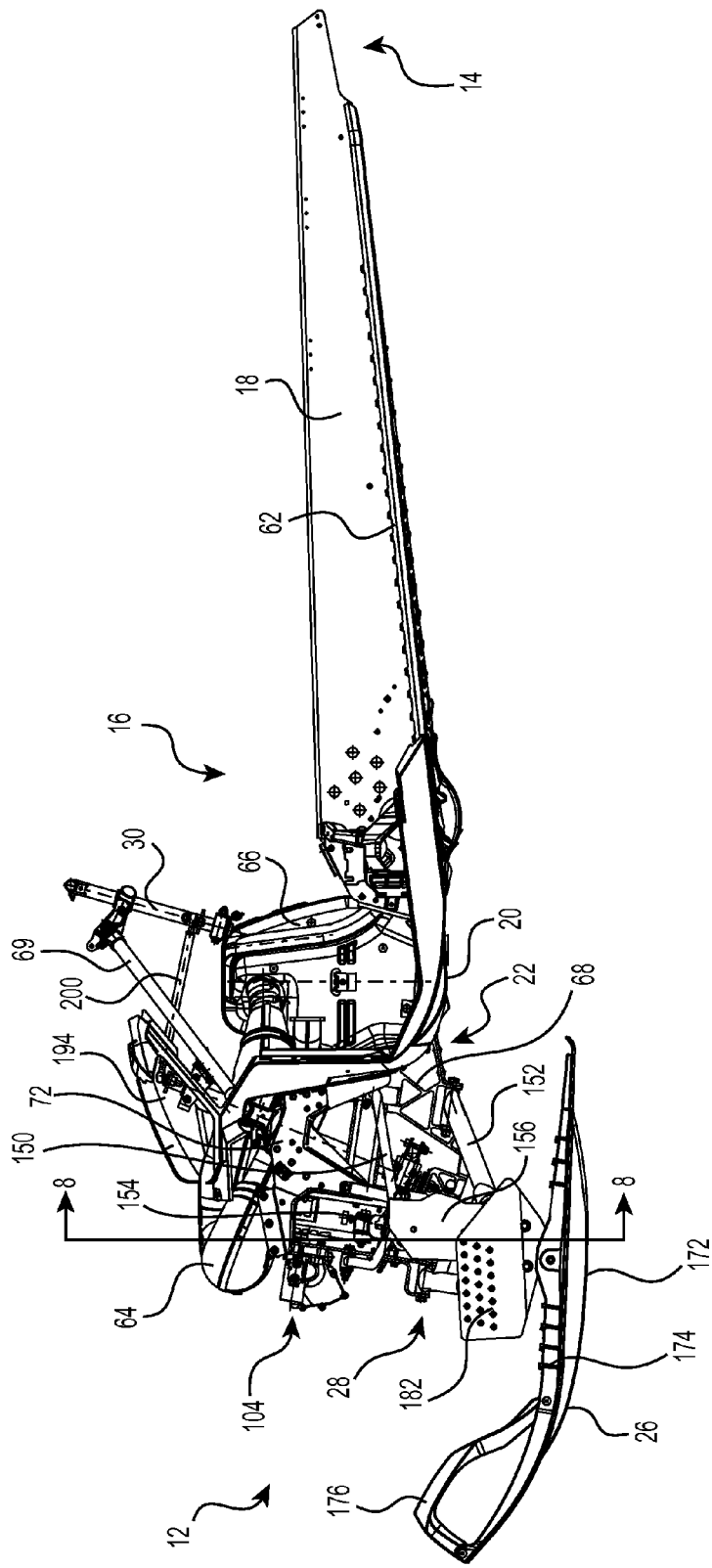
FIG. 2 is a left side elevation view of a frame, front suspension assemblies, skis and exhaust system of the snowmobile of FIG. 1.
Figure 3:
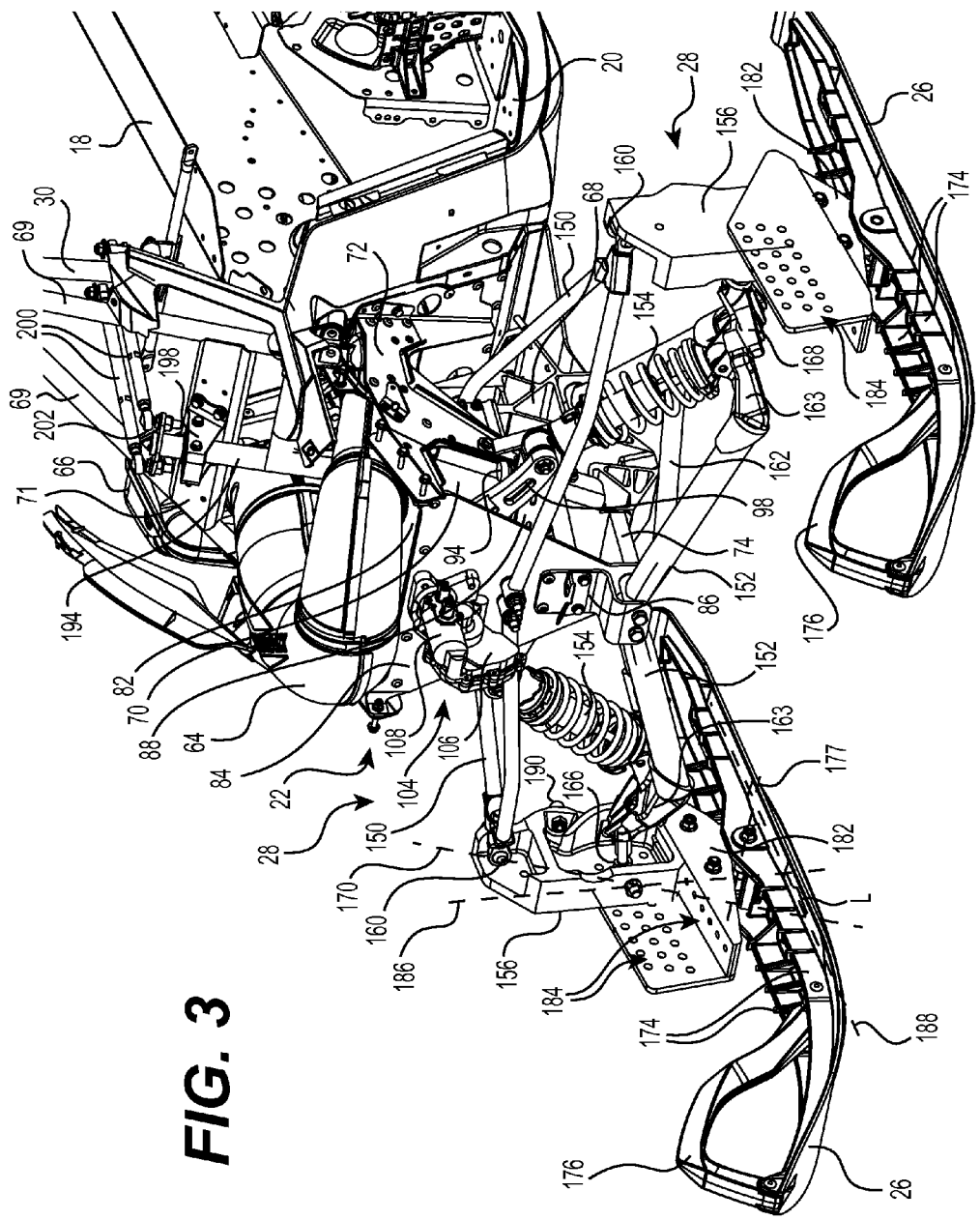
FIG. 3 is a perspective view taken from a front left side of a front portion of the snowmobile components of FIG. 2.

Referring to FIG. 1, the snowmobile 10 will be described. The snowmobile 10 has a front end 12 and a rear end 14, which are defined consistently with the forward travel direction of the snowmobile. The snowmobile 10 has a frame 16 that includes a tunnel 18, an engine cradle portion 20 (FIG. 2) and a front suspension assembly portion 22. An engine 24, which is schematically illustrated in FIG. 1, is carried by the engine cradle portion 20 of the frame 16. The engine 24 is a two-stroke, two-cylinder internal combustion engine having, but it is contemplated that the engine 24 could be any type of motor, such as, for example, a four-stroke internal combustion engine or an electric motor. A ski and steering assembly is provided, in which two skis 26 are positioned at the front end 12 of the snowmobile 10, and are attached to the front suspension assembly portion 22 of the frame 16 through front suspension assemblies 28 that will be described in greater detail below. The skis 26 are operatively connected to a steering assembly including a steering column 30 and a handlebar 32 as will be described in greater detail below.

An endless drive track 34 is positioned at the rear end 14 of the snowmobile 10 and is disposed under the tunnel 18. The endless drive track 34 is operatively connected to the engine 24 through a reduction drive 25 (not shown in this embodiment, but it is the same as the one shown in the alternative embodiment of FIGS. 13 and 14) and a belt transmission system 36 which is schematically illustrated by broken lines. The belt transmission system 36 is a continuously variable transmission (CVT), but other types of belt transmission systems are contemplated. Drive sprockets (not shown) disposed at a front of the tunnel 18 inside the drive track 34 are driven by the reduction drive 25 and engage drive lugs 37 (FIG. 12) extending from an inner surface of the drive track 34 and/or apertures (not shown) formed along the length of the drive track 34. Thus, the endless drive track 34 is driven to run about a rear suspension assembly 38 for propulsion of the snowmobile 10. Terrain lugs 40 (only some of which have been labelled for clarity) are disposed circumferentially about the outer side of the drive track 34 to provide traction to the drive track 34. The specific distribution pattern and dimensions of the terrain lugs 40 will vary depending on the application and desired characteristics of the drive track 34. The rear suspension assembly 38 is connected to the tunnel 18. The rear suspension assembly 38 includes a pair of slide rails 42, a front transverse shaft (not shown) connected to the tunnel 18, a shock absorber 44 connected between the front transverse shaft and the slide rails 42, and front suspension arms 46 connected between the front transverse shaft and the slide rails 42. The rear suspension assembly 38 also includes a rear transverse shaft (not shown) connected to the tunnel 18, a shock absorber 48 connected between the rear transverse shaft and the slide rails 42, rear suspension arms 50 connected between the rear transverse shaft and the slide rails 42, and torsion springs 52 (only partially shown) disposed around the rear transverse shaft and having an end supported by the slide rails 42. A number of wheels 54 are connected to the slide rails 42 and the front and rear transverse shaft and roll along the inner surface of the endless drive track 34 when the snowmobile 10 is in movement. The above-described rear suspension assembly 38 is one possible embodiment of a rear suspension assembly that can be used with the snowmobile 10. It is contemplated that other embodiments of rear suspension assemblies can be used with the snowmobile 10.

At the front end 12 of the snowmobile 10, there are provided fairings 56 that enclose the engine 24, the reduction drive 25 and the belt transmission system 36, thereby providing an external shell that not only protects these components, but also make the snowmobile 10 more aesthetically pleasing. The fairings 56 include one or more panels that can be opened to allow access to the engine 24, the reduction drive 25, the belt transmission system 36 and other components of the snowmobile 10 disposed inside the fairings 56. A windshield 58 is connected to the fairings 56 near the front end 12 of the snowmobile 10, or may alternatively be attached directly to the handlebar 32. The windshield 58 acts as a windscreen to lessen the force of the air on the rider while the snowmobile 10 is moving.

A seat 60 is connected to and disposed on the tunnel 18. Two footrests 62 extend laterally from the tunnel 18 on opposed sides of the snowmobile 10 below the seat 60 to accommodate the rider's feet.

Figure 4:
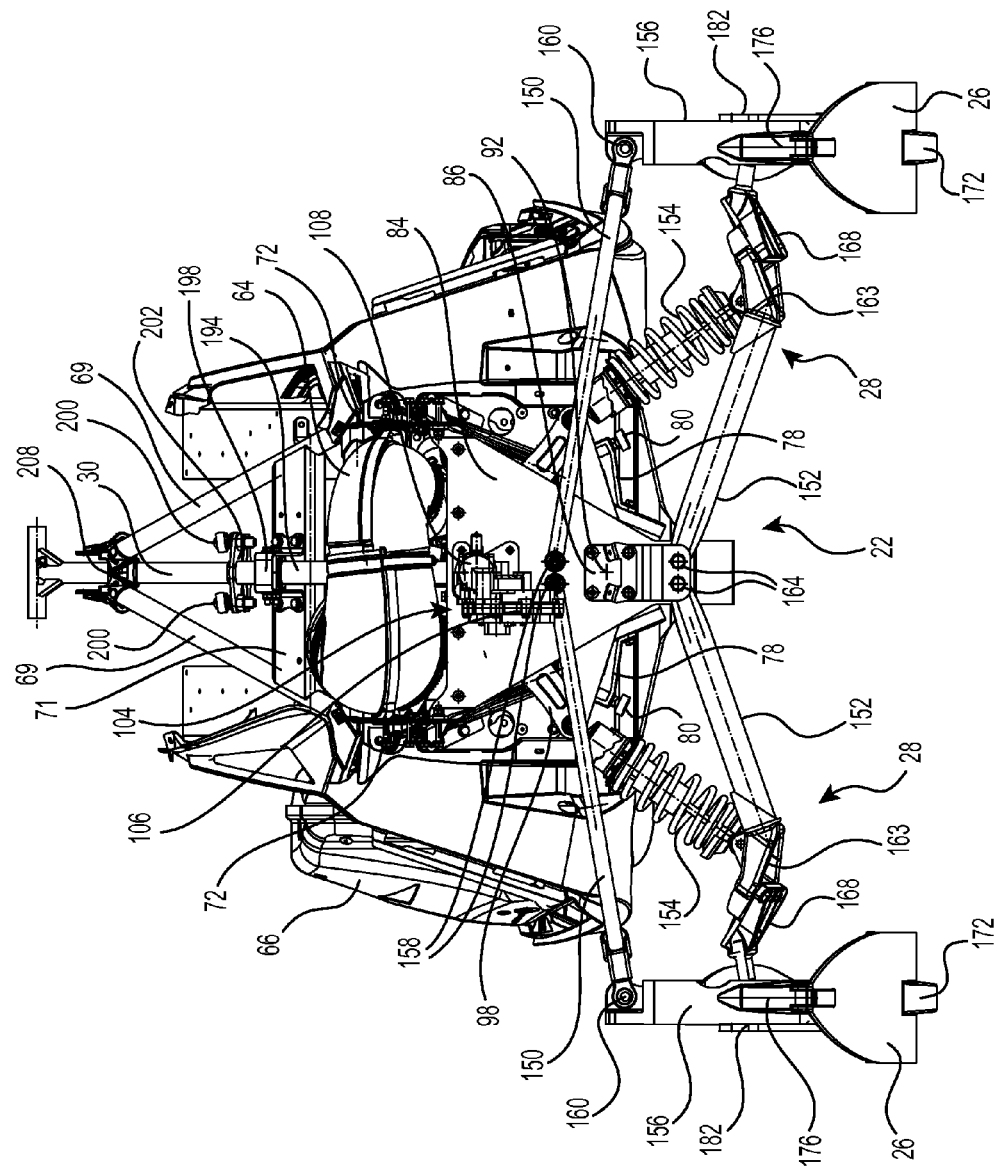
FIG. 4 is a front elevation view of the snowmobile components of FIG. 2.
Figure 5:
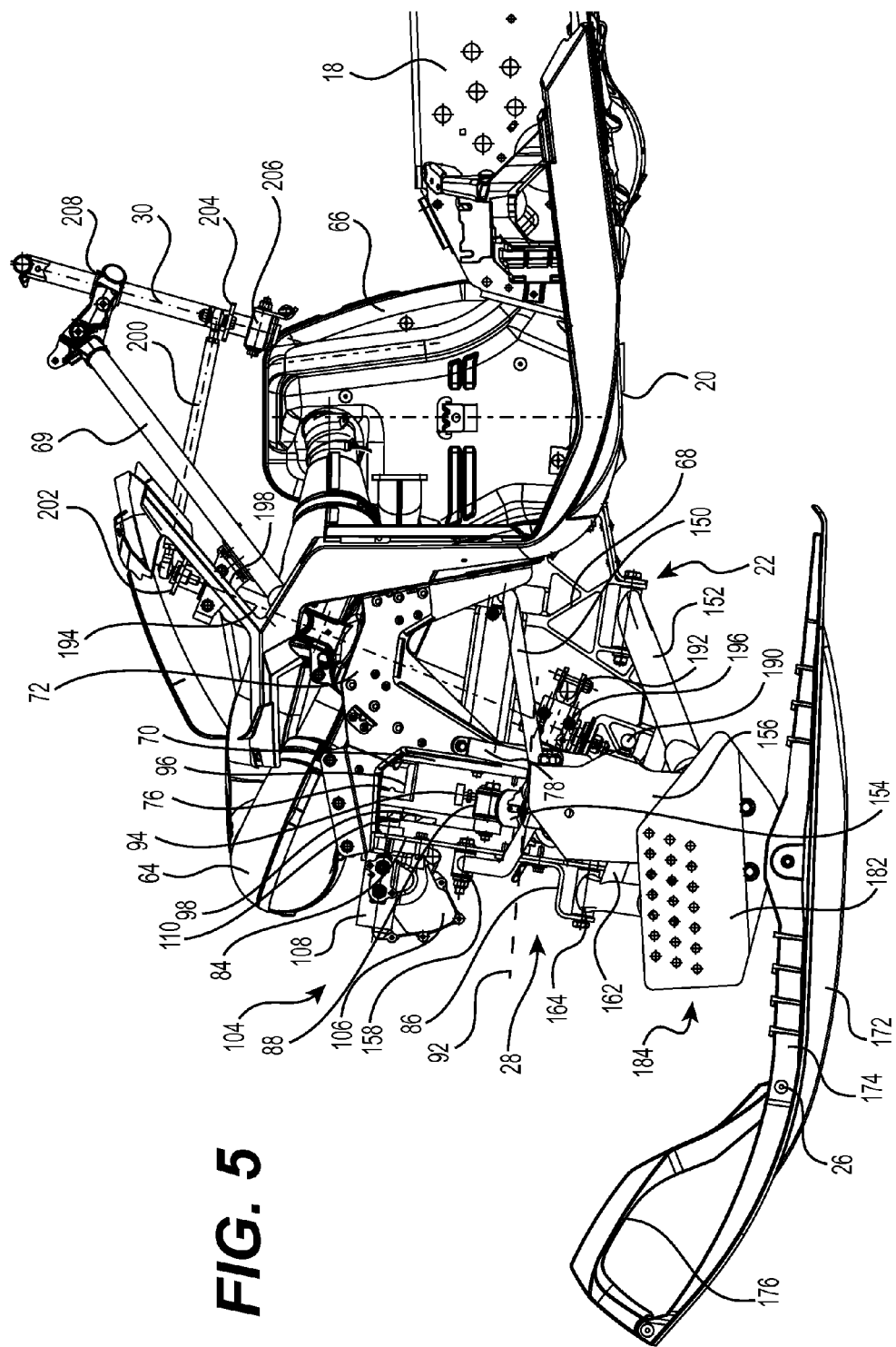
FIG. 5 is a left side elevation view of a front portion of the snowmobile components of FIG. 2.
Figure 6:
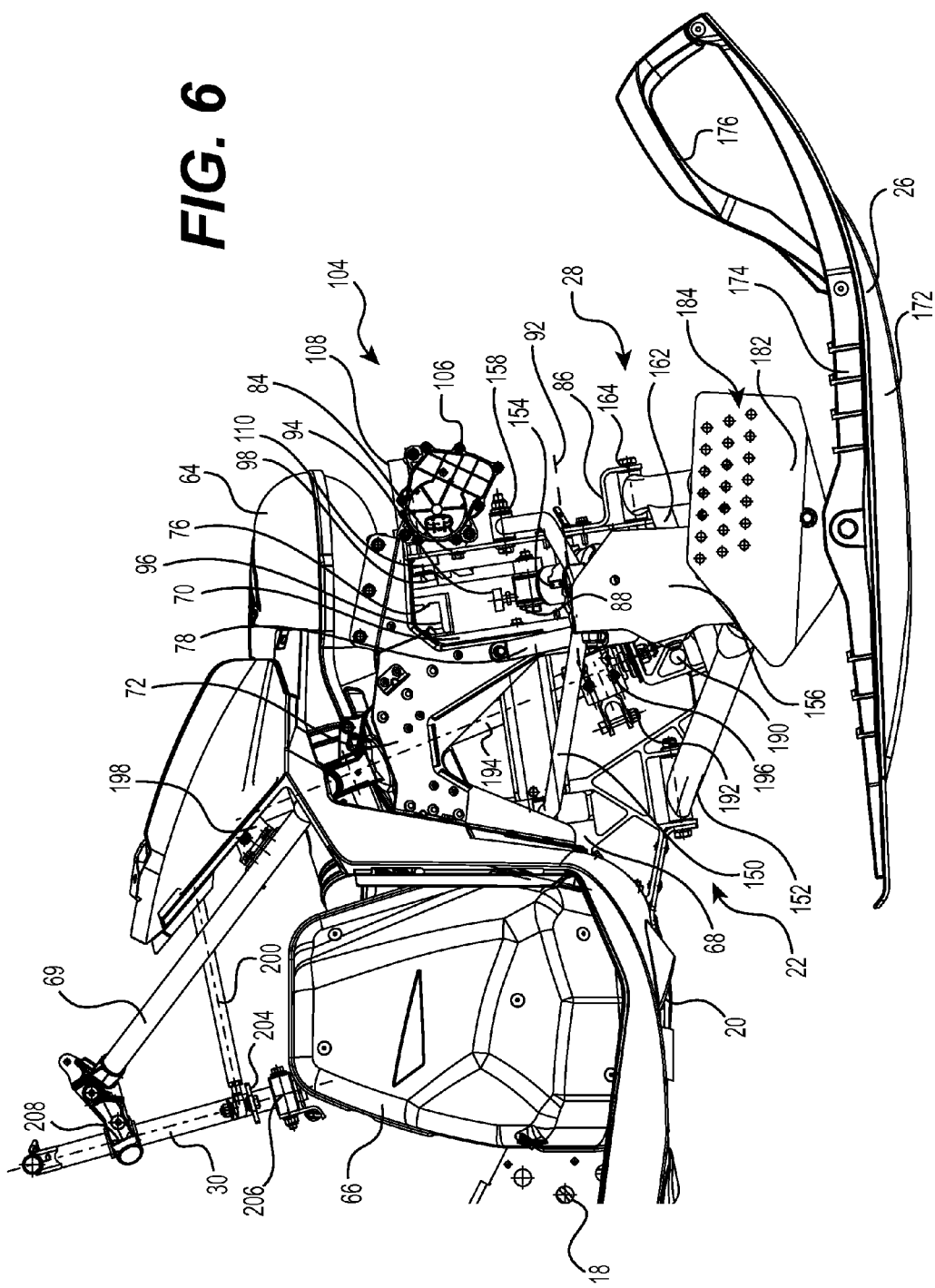
FIG. 6 is a right side elevation view of a front portion of the snowmobile components of FIG. 2.
Figure 13:
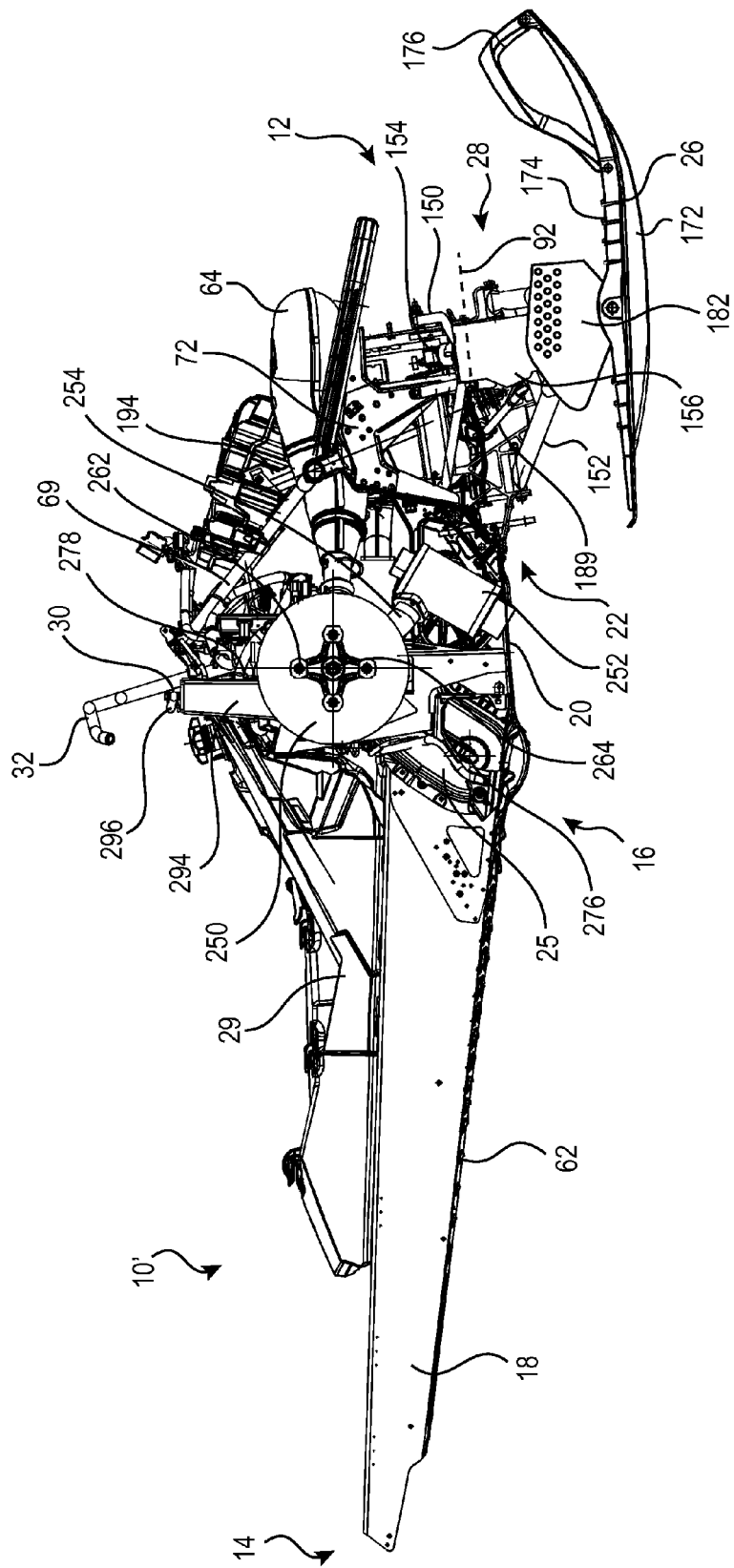
FIG. 13 is a right side elevation view of a frame, front suspension assemblies, skis and exhaust system of an alternative embodiment of the snowmobile of FIG. 1 having an inertia wheel.
Figure 14:
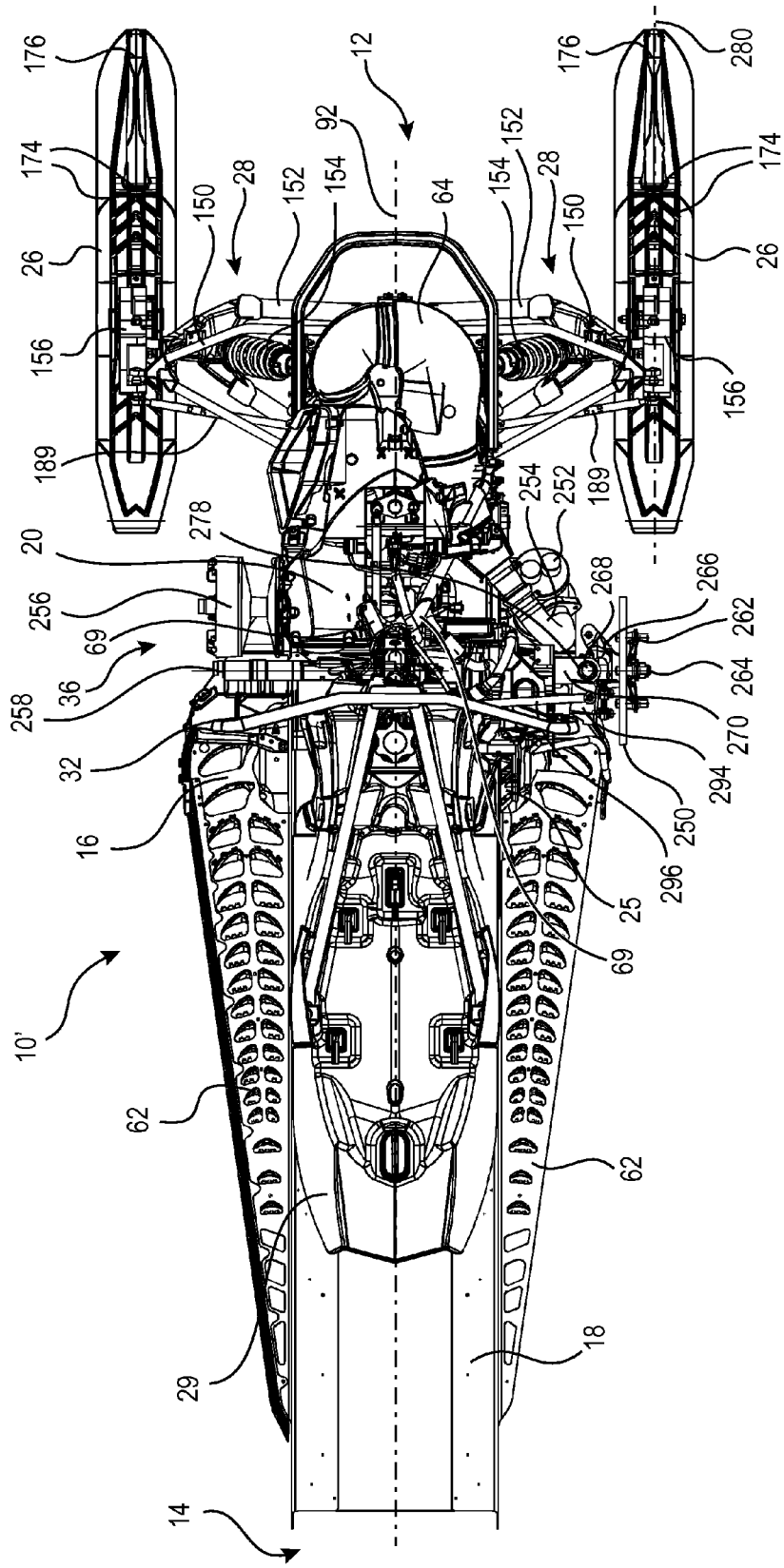
FIG. 14 is a top plan view of the snowmobile components of FIG. 13.

The engine 24 receives fuel from a fuel supply system (not shown) including a fuel tank 63 (not shown in this embodiment, but it is the same as the one shown in the alternative embodiment of FIGS. 13 and 14) mounted on the tunnel 18 and fuel injectors (not shown). Air is supplied to the engine 24 by an air intake system (not shown) including an airbox, a throttle body disposed downstream of the air box, and an air intake manifold fluidly communicating the throttle body with air intake ports (not shown) of the engine 24 disposed on a rear side thereof. Other embodiments of air intake systems are contemplated. For example, one throttle body could be provided per cylinder of the engine 24, and as such the air intake manifold is omitted and, if necessary, replaced by one air intake pipe per cylinder for fluidly communicating each throttle body to its corresponding air intake port. Exhaust gases exit the engine 24 via the exhaust ports (not shown in the present embodiment, but shown as reference number 65 in the embodiment of FIG. 19) of the engine 24 disposed on a front side thereof. From the exhaust ports, the exhaust gases flow into an exhaust manifold (not shown), then into an exhaust pipe in the form of a tuned pipe 64 (FIG. 2), a muffler 66 (FIG. 2) and finally out to the atmosphere. As can be seen in FIGS. 2 to 10, the tuned pipe 64 is generally U-shaped and extends in part over the suspension assembly portion 22 and the muffler 66 is disposed on a right side of the engine cradle 20. As best seen in FIG. 9, from the exhaust manifold, the tuned pipe 64 extends forward under a cross bar 67 of the frame 16 on a left side of a steering column 194 (described in greater detail below). The tuned pipe 64 then extends to the right and then rearward. As it extends rearward, the tuned pipe 64 passes to the right of the steering column 194 and over the cross bar 67 through the generally triangular surface area defined by the cross bar 67 and left and right frame members 69. As can be seen, from the ends of the cross bar 67, the left and right frame members 69 extend rearward, upward and toward a lateral center of the frame 16. The rearward extending portion of the tuned pipe which extends over the cross bar 67 also extends under a cross member 71 extending between the frame members 69. The outlet of the tuned pipe 64 is connected to the muffler 66. As best seen in FIG. 6, a portion of the tuned pipe 64 is vertically higher than the muffler 66. Other embodiments of exhaust systems are contemplated.

Turning now to FIGS. 2 to 10, the suspension assembly portion 22 will be described in more detail. The suspension assembly portion 22 has a metallic extruded frame member 68 fastened to the front of the engine cradle 20. The extruded frame member 68 is laterally centered. It is contemplated that the extruded frame member 68 could be replaced by a plurality of beams, tubes and/or brackets that are fastened, bonded or welded together. A sheet metal plate 70 is disposed forwardly of the extruded frame member 68 and is fastened along its top to the extruded frame member 68. Side plates 72 are fastened to the left and right sides of the extruded frame member 68 and to the front of the engine cradle 20. The plate 70 has side tabs disposed between the side plates 72 and the extruded frame member 68 and, as such, the tabs are fastened to the extruded frame members 68 by the fasteners used to fasten the side plates to the extruded frame member 68. The lower portion of the plate 70 is disposed between a beam 74 and the extruded frame member 68. The beam 74 is fastened to the extruded frame member 68 by fasteners passing through the lower portion of the plate 70. A triangular member 76 (FIG. 7) is fastened to the front of the upper part of the plate 70 and is laterally centered. Left and right stopper holders 78 are fastened to the side plates 72 and the side tabs of the plate 70 on either side of the suspension assembly portion 22. Left and right stoppers 80 are fastened to and extend downwardly from their respective stopper holders 78. It is contemplated that the stoppers 80 could be integrally formed with the stopper holders 78 or some other portion of the suspension assembly portion 22. In the illustrated embodiment, the stoppers 80 have a cylindrical metal core with a rubberized outer shell, but other types of stoppers are contemplated. A sheet metal top plate 82 is fastened between the upper forward portions of the side plates 72. A sheet metal front plate 84 is fastened along its upper edge to the front of the top plate 82 and along its lower edge to the front of the beam 74. As can be seen, the front plate 84 is spaced from the plate 70 and the front plate 84, plate 70, beam 74 and top plate 82 define a cavity therebetween. A bracket 86 is fastened to the lower portion of the front plate 84 and has a tab that is longitudinally spaced from the front plate 84. It is contemplated that the components of the suspension assembly portion 22 could be made of materials other than metal. For example, it is contemplated that at least some the components of the suspension assembly portion 22 could be made of plastic or composite material. It is also contemplated that the components of the suspension assembly portion 22 could be bonded, welded or integrally formed with each other instead of being fastened. It is also contemplated that one or more of the plates 70, 82, 84 could be replaced by one or more beams, tubes and/or brackets that are fastened, bonded or welded together.

Figure 7:
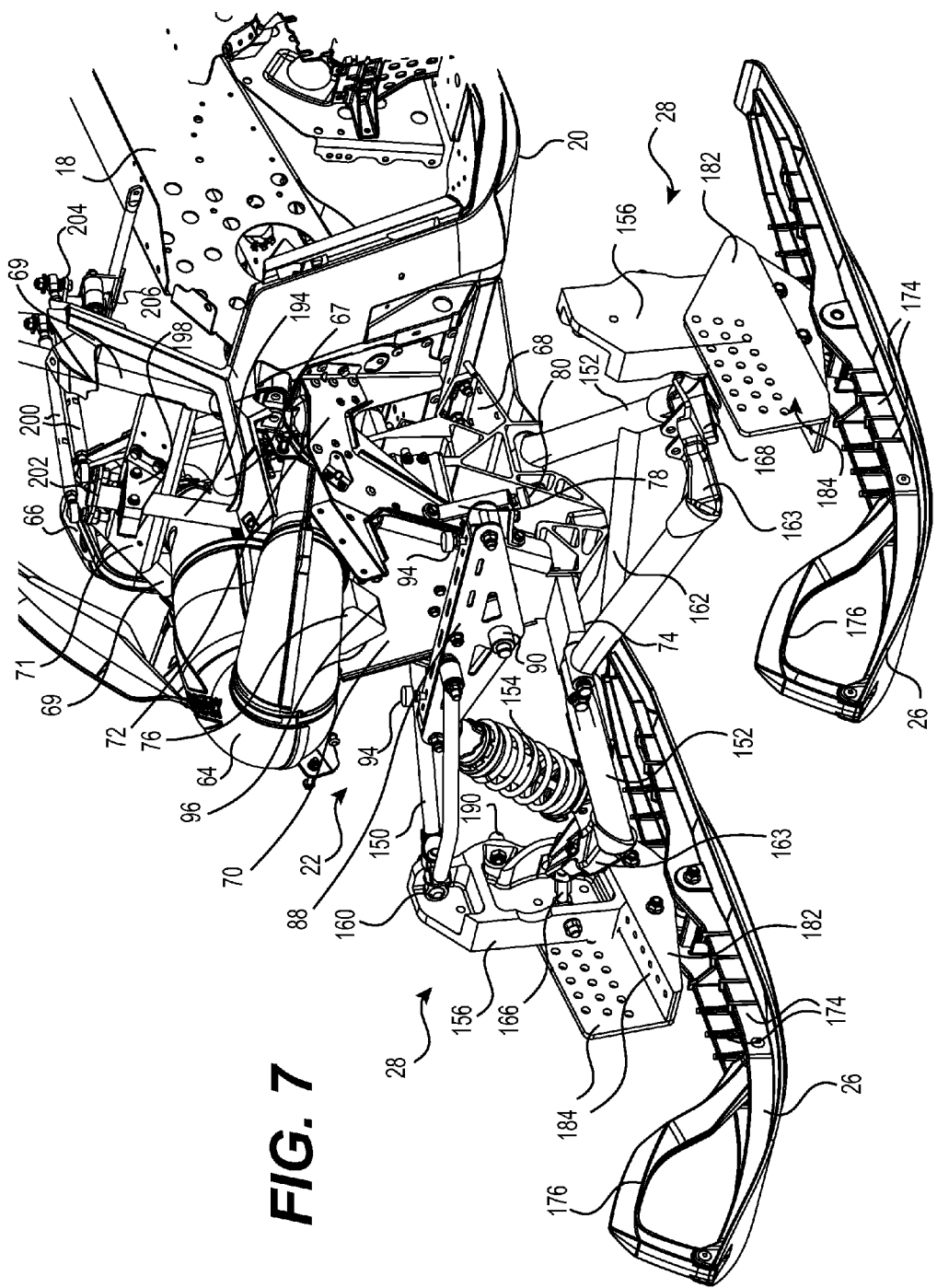
FIG. 7 is a perspective view taken from a front left side of a front portion of the snowmobile components of FIG. 2, with a portion of the frame and of the left suspension assembly removed.

A shock tower 88 is disposed between the plates 70 and 84. As a result, and as can be seen in FIGS. 5 and 6, a portion of the tuned pipe 64 extends forwardly of the shock tower 88. The shock tower 88 is fixedly mounted onto a shaft 90 (FIG. 7). The ends of the shaft 90 are disposed inside bearings (not shown). The front bearing is received in an aperture (not shown) in the plate 84 and the rear bearing is received in an aperture in the plate 70 (not shown). As a result, and as will be described in greater detail below, the shaft 90 and the shock tower 88 can pivot about a pivot axis 92 relative to the frame 16 of the snowmobile 10. The pivot axis 92 is laterally aligned with the longitudinal centerline of the snowmobile 10 when the frame 16 is in an upright position (i.e. the position of the frame shown in FIGS. 2 to 8). The shock tower 88 is generally triangular in shape, but other shapes are contemplated. For example, the shock tower 88 could be generally T-shaped with a horizontal bar of the T being at a top of the shock tower 88. As best seen in FIG. 7, left and right stoppers 94 are fastened to the top of the shock tower 88. The stoppers 94 are positioned along the top of the shock tower 88 such that when the frame 16 leans by a predetermined angle relative to the shock tower 88, the corresponding stopper 94 (i.e. the left stopper 94 when the frame 16 leans left and the right stopper 94 when the frame 16 leans right) makes contact with a corresponding one of the contact surfaces 96 (FIG. 7) defined by the triangular member 76, as will be described in greater detail below. In the illustrated embodiment, the stoppers 94 have a cylindrical metal core with a rubberized outer shell, but other types of stoppers are contemplated. It is contemplated that the stoppers 94 could be integrally formed with the shock tower 88. It is also contemplated that the stoppers 94 could be connected to the triangular member 76, or some other portion of the suspension assembly portion 22, and that the contact surfaces 96 could be defined on the shock tower 88. As can be seen in FIG. 7, when the frame 16 is in the upright position as shown, the stoppers 94 are vertically higher than the stoppers 80.

Figure 8:
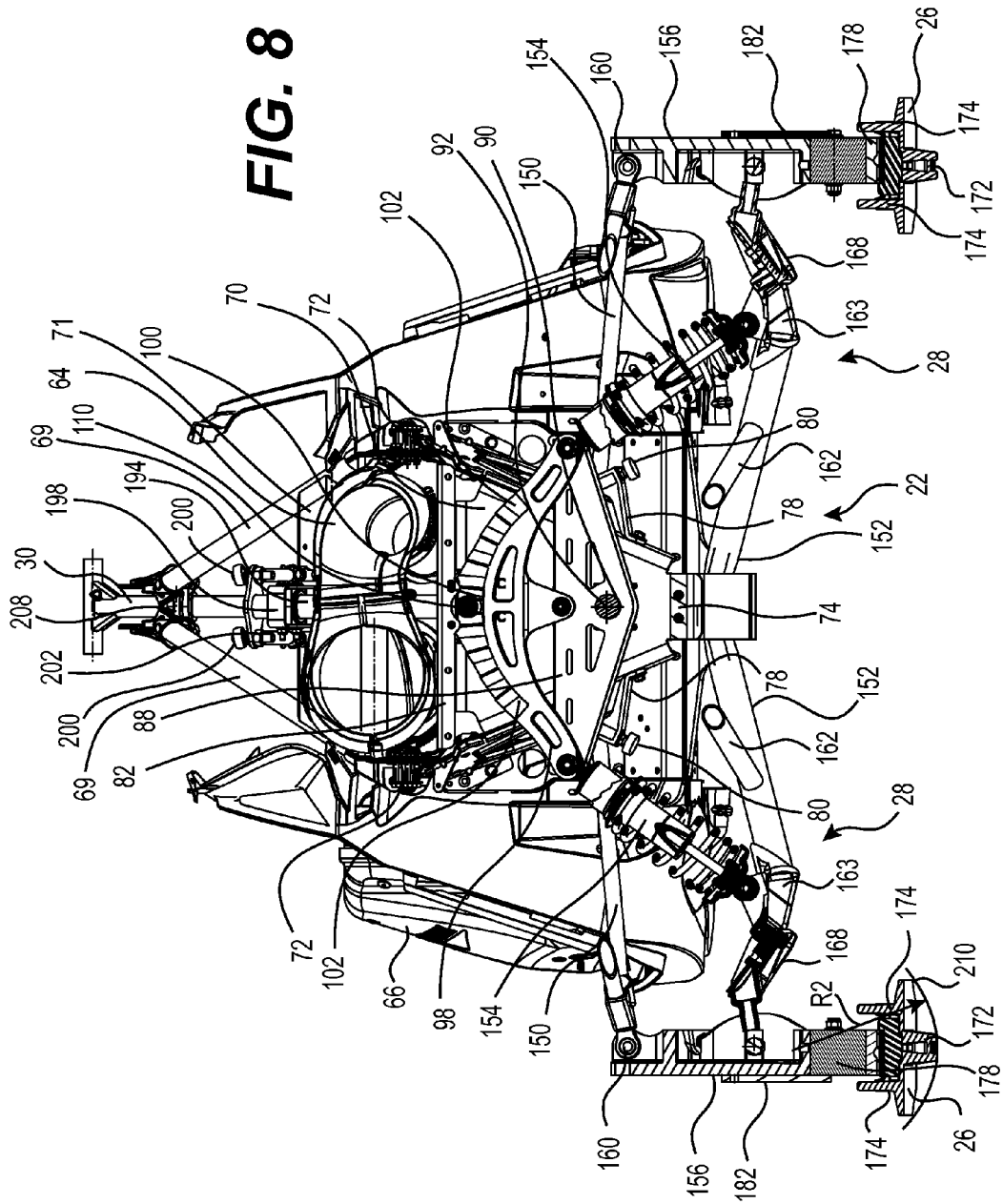
FIG. 8 is a cross-sectional view of the snowmobile components of FIG. 2 taken through line 8-8 of FIG. 2.
Figure 9:
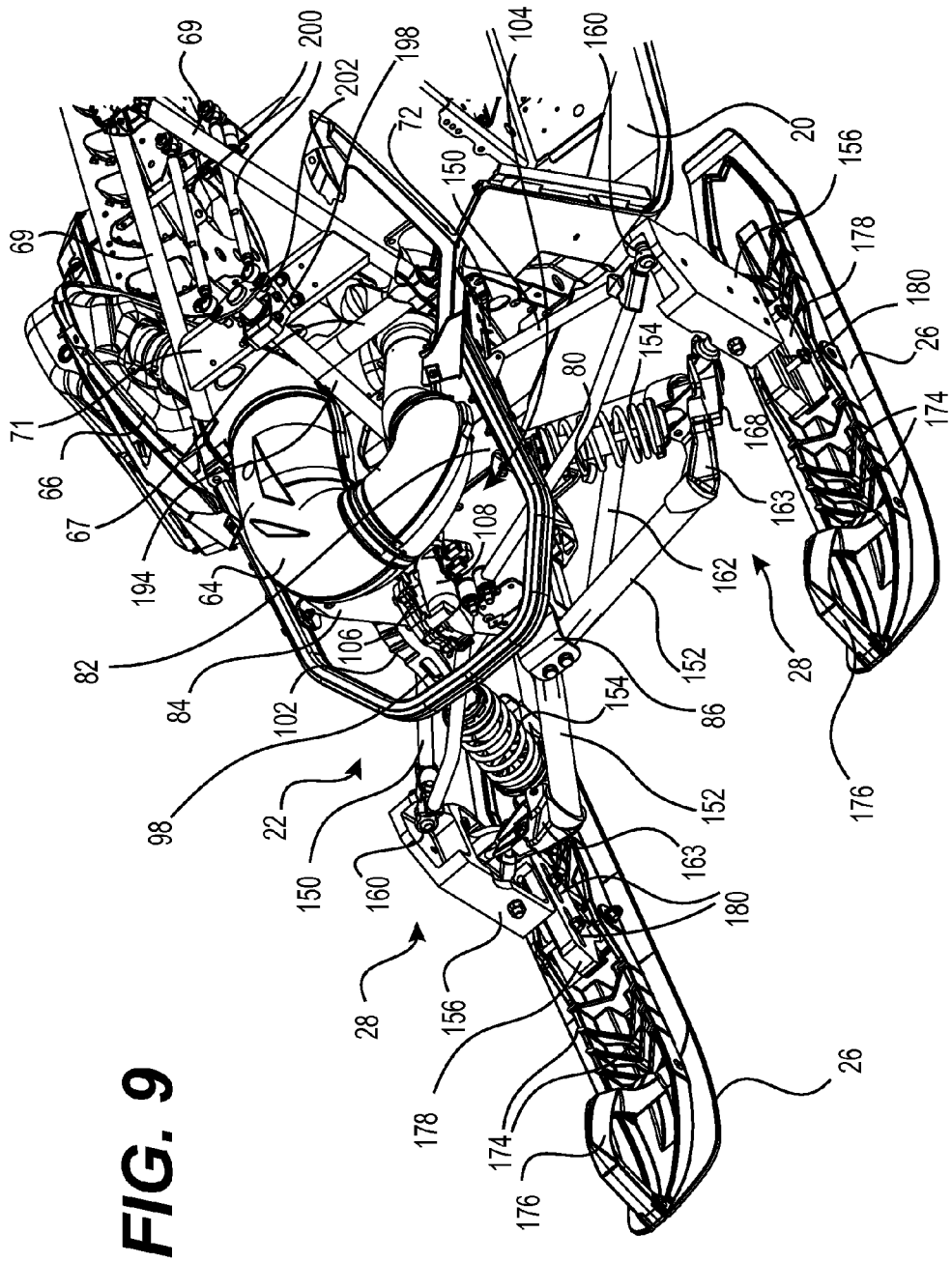
FIG. 9 is a perspective view taken from a front left side of a front portion of the snowmobile components of FIG. 2 shown leaning toward a left side.

A rack 98 is disposed between the plates 70 and 84 and is fastened to the front of the shock tower 88 as shown in FIG. 8. As such, the rack 98 is fixed relative to the shock tower 88. As can also be seen in FIG. 8, the rack 98 has a central aperture 100 located at a lateral center of the rack 98 at a top thereof, and left and right forwardly facing ratchet surfaces 102 on either sides of the central aperture 100. The central aperture 100 and the ratchet surfaces 102 generally define an arc having the pivot axis 92 as a center of curvature.

Figure 10:
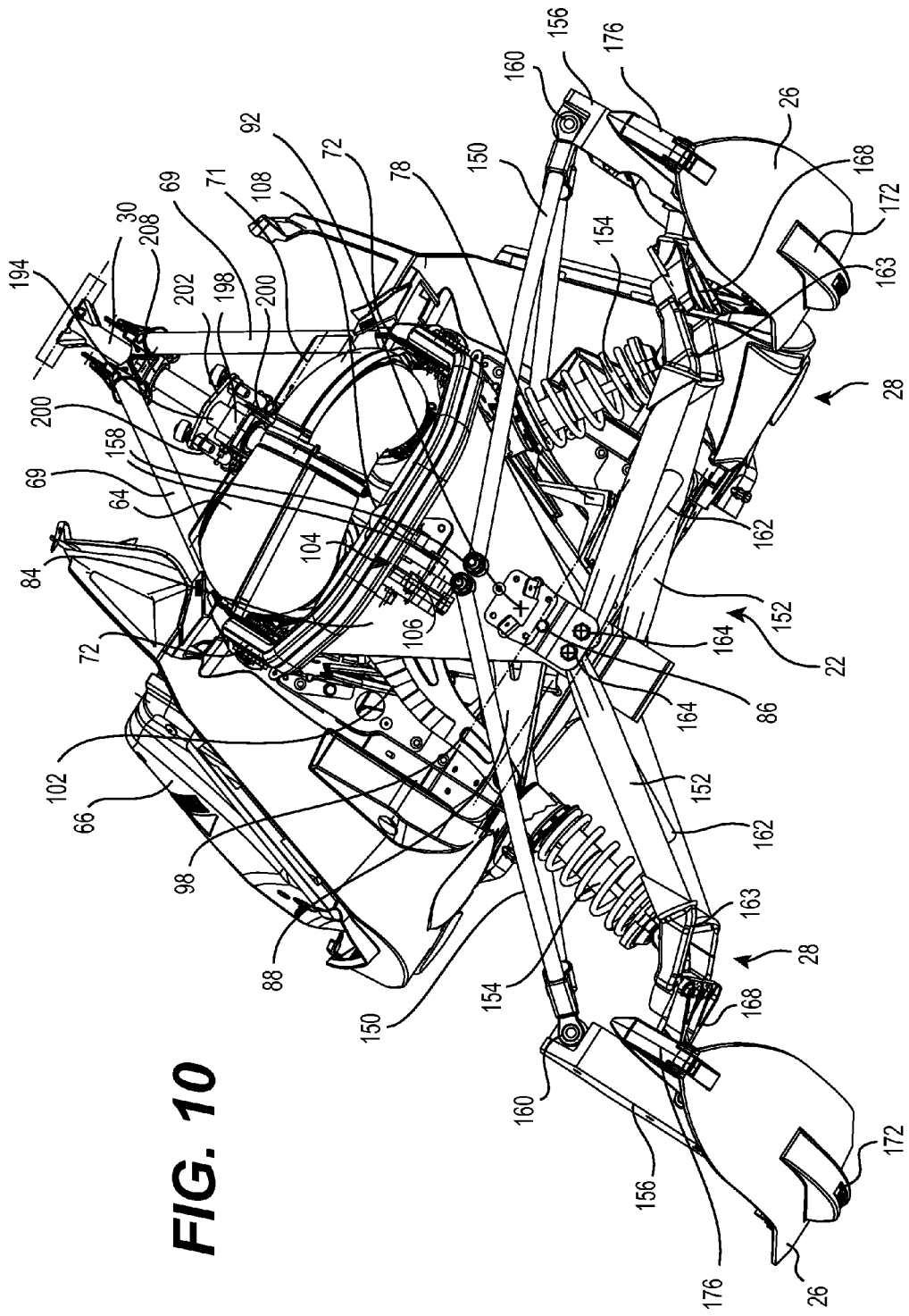
FIG. 10 is a front elevation view of the snowmobile components of FIG. 2 shown leaning toward a left side.

A locking mechanism 104 is mounted onto the front of the plate 84. The locking mechanism 104 includes an electric motor 106, a cylinder 108 and a pin 110 (FIG. 8). The pin 110 is slidably received in the cylinder 108 and passes through an aperture (not shown) in the plate 84 in alignment with the central aperture 100 of the rack 98 when the frame 16 is in the upright position. The electric motor 106 slides the pin 110 rearwardly such that the pin 110 can be received in the central aperture 100 of the rack 98 when the frame 16 is in the upright position. When the pin 110 is received in the central aperture 100 of the rack 98, the frame 16 is locked in the upright position and cannot pivot relative to the shock tower 88. When the frame 16 is pivoted from the upright position relative to the shock tower 88 and the electric motor 106 slides the pin 110 rearwardly such that the pin 110 abuts one of the ratchet surfaces 102, the interaction between the pin 110 and the ratchet surface 102 it abuts prevent the frame 16 from pivoting further away from the upright position, but permits the frame 16 from being pivoted back to the upright position such that the pin 110 can be received in the central aperture 100, thereby locking the frame 16 in the upright position. For example, when the frame 16 is pivoted to the left with relative to the shock tower 88 as shown in FIGS. 9 and 10 and the electric motor 106 slides the pin 110 rearward to abut the left ratchet surface 102, the frame 16 is prevented from pivoting further toward the left relative to the shock tower 88, but can be pivoted toward the right relative to the shock tower 88 up to the upright position. When the electric motor 106 slides the pin 110 forwardly such that the pin 110 is not received in the central aperture 100 and does not abut a ratchet surface 102 of the rack 98, the frame 16 is free to lean relative to the shock tower 88 until one of the stoppers 94 makes contact with its corresponding contact surface 96 as will be discussed in greater detail below. It is contemplated that the electric motor 106 could be replaced by another type of actuator, such as, but not limited to, a hydraulic actuator or a solenoid. It is also contemplated that the rack 98 could be connected to the rear side of the shock tower 88, with the ratchet surfaces 102 facing rearward and the locking mechanism 104 mounted to a rear surface of the plate 70.

It is contemplated that the electric motor 106, and therefore the position of the pin 110, can be controlled by a switch, buttons or any other input means to be actuated by the driver of the snowmobile 10. As a result, the driver of the snowmobile 10 can decide to operate the snowmobile 10 as a leaning vehicle by unlocking the frame 16 from the shock tower 88 or to operate the snowmobile 10 as a more typical steer-in-direction snowmobile by locking the frame 16 relative to the shock tower 88. It is also contemplated that the electric motor 106 could be controlled to automatically move the pin rearwardly when the snowmobile 10 is operated below a predetermined speed or stopped.

The right front suspension assembly 28 will now be described in more detail. The left front suspension assembly 28 is a mirror image of the right front suspension assembly 28 and will therefore not be described in detail herein. Elements of the left front suspension assembly 28 corresponding to elements of the right front suspension assembly 28 have been labelled with the same reference numerals in the figures.

The right front suspension assembly 28 has upper and lower suspension arms 150, 152, a shock absorber 154 and a ski leg 156.

The upper suspension arm 150 is made of two arms connected at their distal ends to form a generally V-shape. The proximal end of the rear arm of the upper suspension arm 150 is pivotally connected about an upper suspension arm pivot axis 158 in a recess formed in the extruded frame member 68. The proximal end of the front arm of the upper suspension arm 150 is pivotally connected about the upper suspension arm pivot axis 158 to the front of plate 84 above the bracket 86. The upper suspension arm pivot axis 158 is parallel to the pivot axis 92 and, as best seen in FIG. 4, is slightly laterally offset from the pivot axis 92 when the frame 16 is in the upright position. A ball joint 160 is connected to the distal ends of the two arms of the upper suspension arms 150. A fastener connects the ball joint 160 to an upper portion of the ski leg 156 such that the upper suspension arm 150 is pivotally connected to the ski leg 156. More specifically, the ball joint 160 is connected to a rear wall of the ski leg 156.

The lower suspension arm 152 is made of two arms and a cross-member 162 connected between these two arms. The two arms are connected at their distal ends by a connector 163 to form a generally V-shape. The proximal end of the rear arm of the lower suspension arm 152 is pivotally connected about a lower suspension arm pivot axis 164 in a recess formed in the extruded frame member 68. The proximal end of the front arm of the lower suspension arm 152 is pivotally connected about the upper suspension arm pivot axis 164 between the front of the plate 84 and the tab of the bracket 86. The lower suspension arm pivot axis 164 is parallel to the pivot axis 92 and, as best seen in FIG. 4, is slightly laterally offset from the pivot axis 92 when the frame 16 is in the upright position. The cross-member 162 and its corresponding stopper 80 are arranged such that the cross-member provides a contact surface for the stopper 80 to abut under certain conditions as will be described in greater detail below. It is contemplated that the stopper 80 could be attached on the cross-member 162 and that a contact surface could be provided on the frame 16 at the position where the stopper 80 is shown in the figures. A ball joint 166 is connected to the connector 163 of the lower suspension arms 152 via a connector 168 (FIG. 4). A fastener connects the ball joint 166 to a portion of the ski leg 156 that is vertically below and forward of the ball joint 160 such that the lower suspension arm 152 is pivotally connected to the ski leg 156. More specifically, the ball joint 166 is connected to a front wall of the ski leg 156. The connectors 163 and 168 each have a plurality of apertures used to fasten the two together. These apertures allow the longitudinal position of the connector 168 to be changed, which in turn changes the longitudinal position of the ball joint 166. Changing the position of the ball joint 166 changes the caster angle of the ski leg 156. The caster angle is the angle between vertical and a line 170 (FIG. 3) passing through the center of both ball joints 160, 166. It is contemplated that the longitudinal position of the lower ball joint 166 could be modified in other ways. For example, the aperture in one or both of the connectors 163, 168 could be replaced with slots. It is also contemplated that the longitudinal position of the upper ball joint 160 could be adjustable instead of or in addition to the adjustability of the lower ball joint 166.

The shock absorber 154 includes a hydraulic damper around which is disposed a coil spring. The lower end of the shock absorber 154 is pivotally connected to a bracket integrally formed on the connector 163 of the lower suspension arm 152. The upper end of the shock absorber 154 is pivotally connected to the corresponding distal end of the shock tower 88. As can be seen in FIG. 7 for the left end, a space is formed between the front and rear walls of the shock tower 88 at its distal end to receive the upper end of the shock absorber 154. As can be seen, the lower end of the shock absorber 154 is located laterally outwardly of its upper end.

The right ski 26 and its connection to the right ski leg 156 will now be described in more detail. The left ski 26 and its connection to the left ski leg 156 are a mirror image of the right ski 26 and its connection to the right ski leg 156 and will therefore not be described in detail herein. Elements of the left ski 26 and its connection to the left ski leg 156 corresponding to elements of the right ski 26 and its connection to the right ski leg 156 have been labelled with the same reference numerals in the figures.

The ski 26 has an upturned front portion, a keel 172 laterally centered on the bottom of the ski 26, two ribs 174 extending longitudinally on the top of the ski 26, and a handle 176 connected to the upturned portion between the ribs 174. It is contemplated that other types of snowmobile skis could be used.

The ski 26 is pivotally connected about a pivot axis 177 (FIG. 3) to a first ski connector 178 (FIG. 9) by a fastener. As can be seen, the first ski connector is received between the ribs 174 and is fastened to the ski 26 near the longitudinal center of the ski 26. As can be seen in FIG. 9, the first ski connector 178 has two longitudinal slots 180. A second ski connector 182 is disposed over the first ski connector 178 and is connected to it by fasteners passing through the slots 180. The second ski connector 182 has an L-shaped portion adapted to abut the bottom and outer surfaces of the ski leg 156. The second ski connector 182 has a number of apertures 184 that permit connection to the ski leg 156 at a number of different positions. The apertures 184 and slots 182 allow the ski 26 to be selectively moved relative to the ski leg 156 along the longitudinal axis of the ski 26. The apertures 184 permit "macro" adjustment, while the slots 182 permit a more precise "micro" adjustment of the position of the ski 26 relative to the ski leg 156. It is contemplated that the apertures 184 could be replaced by slots. It is also contemplated that the slots 180 could be replaced by apertures. It is also contemplated that the first and second ski connectors 178, 182 could be replaced by a single ski connector having slots or apertures. It is also contemplated that other adjustment mechanisms could be provided. For example, the slots or multiple apertures could be provided on the ski leg 156. It is contemplated that in some embodiment, the position of the ski 26 relative to the ski leg 156 could be fixed.

By changing the position of the ski 26 relative to the ski leg 156 along the longitudinal axis of the ski 26, the trail length L (FIG. 3) of the ski 26 is changed. The trail length L is the distance between the point of intersection of a vertical line 186 passing through the pivot axis 177 with the ground (line 188, FIG. 3) and the point of intersection of the caster line 170 with the ground 188. Changing the caster angle also changes the trail length L. The caster angle controls the degree of self-centering of the ski 26. The trail length L affects the handling characteristics of the snowmobile 10 (i.e. how stable the steering feels to the driver). Caster and trail length determine in part the amount of force necessary to steer the skis 26 and the straight line stability of the skis 26. As explained above, the snowmobile 10 can be driven as a leaning vehicle by allowing the frame 16 to pivot relative to the shock tower 88 or can be driven as a steer-in-direction vehicle by locking the frame 16 to the shock tower 88. As these are two very different driving conditions, the desired steering forces are not the same for both conditions. As such, by allowing both the caster angle and trail length to be adjusted, the steering forces required and the straight line stability of the skis 26 can be adjusted to best suit the selected driving condition (i.e. leaning or steer-in-direction).

To steer the skis 26, each ski leg 156 is connected to a steering rod 189 (not shown in this embodiment, but they are the same as the ones shown in the alternative embodiment of FIGS. 13 and 14) via a ball joint 190 (FIGS. 5 and 6) connected to the back of the ski leg 156. The proximal ends of the steering rods 189 are connected to a pitman arm 192 (FIGS. 5 and 6) connected to the lower portion of a steering column 194. The steering column 194 is connected to the frame 16 by lower and upper brackets 196, 198 inside which it can pivot. The upper bracket 198 is connected to the cross member 71. The steering column 194 is disposed forward of the cross bar 67. A pair of connecting rods 200 having ball joints at both ends is connected between a flange 202 (FIG. 4) at a top of the steering column 194 forward of the generally triangular surface area defined by the cross bar 67 and left and right frame members 69 and a flange 204 (FIGS. 5 and 6) near a bottom of the steering column 30 rearward of the generally triangular surface area defined by the cross bar 67 and left and right frame members 69, thereby transmitting steering motion between the steering columns 30 and 194. As can be seen in FIG. 9, the connecting rods 200 extend through the generally triangular surface area defined by the cross bar 67 and left and right frame members 69. The steering column 30 is connected to the frame 16 by lower and upper brackets 206, 208 inside which it can pivot. As can be seen in FIG. 5, the bracket 208 is connected to the upper ends of the frame members 69. The lower end of the steering column 30 is disposed rearward of the generally triangular surface area defined by the cross bar 67 and left and right frame members 69. It is contemplated that the steering column 30 could be disposed more forwardly than illustrated so as to extend through the generally triangular surface area defined by the cross bar 67 and left and right frame members 69. As a result of this arrangement, when the handlebar 32, which is connected to the steering column 30, is turned in one direction, the skis 26 are turned in the same direction. It is contemplated that the steering columns 30 and 194 could be replaced by a single steering column or by more than two steering columns. It is also contemplated that the snowmobile 10 could be provided with a power steering system where an actuator, such as an electric motor or a hydraulic actuator, moves the steering rods 189 to steer the skis 26.

When the frame 16 is locked to the shock tower 88, the snowmobile 10 is steered by turning the handlebar 32 in the direction in which the driver wants to turn. When the frame 16 is not locked to the shock tower 88, the snowmobile 10 is steered by leaning the frame 16 relative to the shock tower 88 in the direction of the turn. To do this, the driver has to countersteer by momentarily turning the handlebar 32 in the direction opposite to the turn thereby causing a moment that leans the frame 16 into the turn. As explained above, the frame 16 pivots about the pivot axis 92. As can be seen in FIGS. 9 and 10, as the frame 16 pivots about the pivot axis 92, the shock tower 88 remains substantially vertical.

The stoppers 80 and 94 prevent the frame 16 from being pivoted too much about the pivot axis 92. An example of the use of the left stoppers 80 and 94 will now be provided for the snowmobile 10 making a left turn as shown in FIGS. 9 and 10. It should be understood that for the snowmobile 10 making a right turn, the same thing occurs but with the right stoppers 80 and 94 and their corresponding contact surfaces on the right side of the snowmobile 10.

As the frame 16 is increasingly pivoted about the pivot axis 92 toward the left relative to the shock tower 88 to make a left turn, the frame 16 eventually reaches an angle where the left contact surface 96 of the triangular member 76 makes contact with the left stopper 94 mounted on the shock tower 88. In an exemplary embodiment, this angle is between 45 and 60 degrees. Between the upright position (i.e. no leaning) and the angle where the stopper 94 makes contact with the contact surface 96, the shock tower 88 remains substantially upright and the shock absorbers 154 are not compressed as a result of the leaning of the frame 16. When the left stopper 94 makes contact with the contact surface 96, the force of the impact is absorbed in part by the left shock absorber 154, thus reducing the transmission of vibrations resulting from the impact from being transferred to the other components of the snowmobile 10 and to the driver and, if applicable, his passenger.

Once the left stopper 94 makes contact with the left contact surface 96, the frame 16 can continue to be pivoted toward the left, but in order to do this, the left shock absorber has to be compressed. This can be done as a result of the angular momentum resulting from the initial leaning of the frame 16 relative to the shock tower 88 when the left stopper 94 made contact with the left contact surface 96 and/or by the driver shifting his weight to cause further pivoting of the frame 16. When the frame 16 is leaned after the left stopper 94 has made contact with the left contact surface 96, not only is the frame 16 pivoted but the shock tower 88 and the other components of the snowmobile 10 are also pivoted with it. As the left shock absorber 154 is compressed to provide further leaning of the snowmobile 10, the left stopper 80 moves toward the cross-member 162 of the lower left suspension arm 152 until it makes contact with it, thereby preventing any further leaning of the snowmobile 10 relative to the vertical. In an exemplary embodiment, the amount by which the left shock absorber 154 is compressed when the left stopper 80 contacts the left cross-member 162 corresponds to 10 to 20 degrees of further leaning of the snowmobile 10 from the angle where the left stopper 94 made contact with the left contact surface 96.

The stoppers 80 and 94 on the right side of the snowmobile 10 limit leaning toward the right by the same angles as the stoppers 80 and 94 on left side of the snowmobile 10 limit leaning toward the left.

It is contemplated that the stoppers 80, 94 could be useful in limiting leaning on an assisted leaning system as providing the stoppers 80, 94 would reduce strain on the leaning actuator which is often used to limit the leaning.

Figure 11:
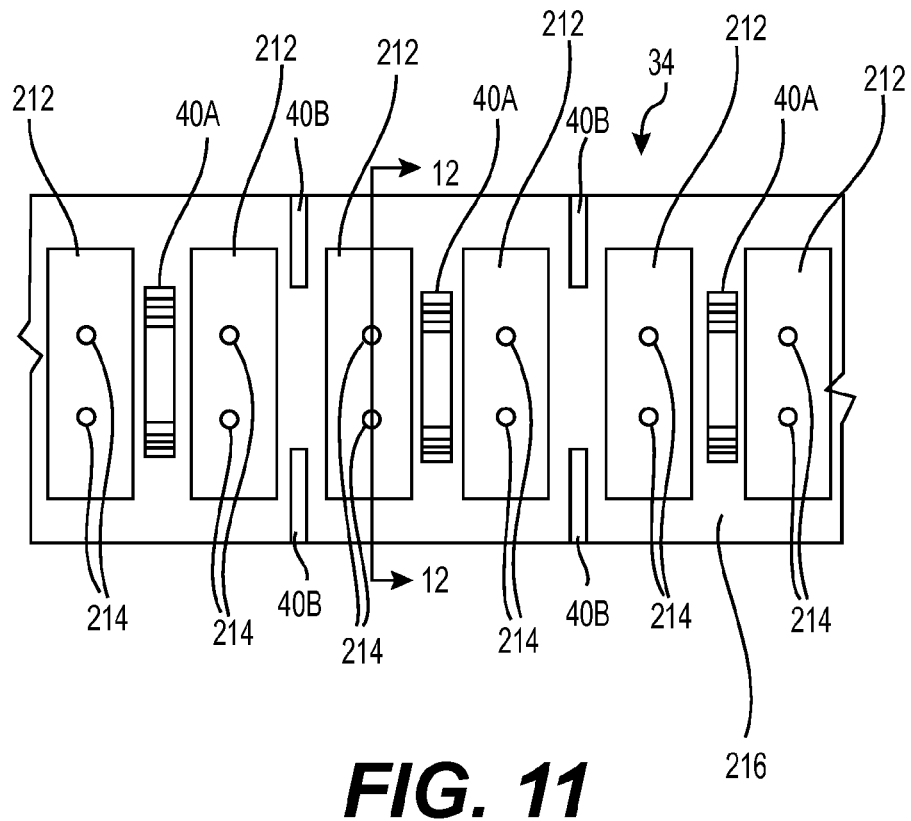
FIG. 11 is a schematic plan view of an outer portion of an alternative embodiment of a track for the snowmobile of FIG. 1.
Figure 12:
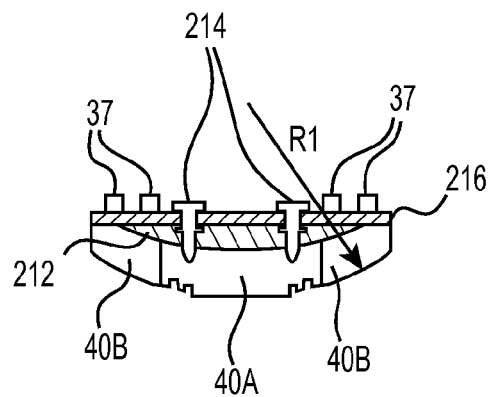
FIG. 12 is a cross-sectional view of the track of FIG. 11 taken through line 12-12 of FIG. 11.

Turning now to FIGS. 11 and 12, the drive track 34 will be described in more detail. To facilitate leaning of the frame 16, the track 34 is provided with an arcuate lateral profile as can be seen in FIG. 12. The radius of curvature R1 of the track 34 and the radius of curvature R2 of an arc 210 (FIG. 8) passing through the lateral edges of the ground contacting surfaces of a ski 26 are selected to be approximately equal to each other or equal to each other. If the radius R1 is greater than the radius R2, the rear of the snowmobile 10 will be pushed up as the frame 16 (and track 34) leans, thereby removing some pressure from the skis 26. However, this can be at least partially counteracted by changing the lateral distance between the lower suspension arm pivot axes 164.

The drive track 34 has central terrain lugs 40A alternating with pairs of outer terrain lugs 40B along the length of the track 34. As can be seen in FIG. 12, the central terrain lugs 40A have a flat central portion with rounded corners of radius R1 and the outer terrain lugs 40B have a rounded edge of radius R1. Between each central terrain lug 40A and pair of outer terrain lugs 40B is connected an arcuate boss 212 of radius R1. Each boss 212 is connected by a pair of fasteners 214 to the belt 216 forming the body of the track 34. As can be seen in FIG. 12, the fasteners 214 protrude from the boss 212 to form cleats, thereby providing additional traction. The bosses 212 are made of plastic, but it is contemplated that they could be made of other materials such as rubber, in which case they could be integrally formed with the belt 216. The pattern of lugs 40A, 40B is only one possible pattern of terrain lugs 40 and other patterns are contemplated. It is also contemplated that the drive track 34 could have generally horizontal lugs 40. In such an embodiment, it is contemplated that the rear suspension 38 could tilt about a longitudinal axis.

Turning now to FIGS. 13 to 18, a snowmobile 10', which is an alternative embodiment of the snowmobile 10, will be described. The snowmobile 10' is the same as the snowmobile 10 except that an inertia wheel 250 and its associated components have been added to it and the exhaust system has been slightly modified as described below to accommodate the inertia wheel and its associated components. Elements of the snowmobile 10' that are the same as those of the snowmobile 10 described above have been labelled with the same reference numerals in the figures and will not be described again. Also, some of the components of the snowmobile 10, such as the endless drive track 34, the rear suspension assembly 38, the seat 60 and the locking mechanism 104, to name a few, have been omitted from FIGS. 13 to 18. It should be understood that the components omitted from these figures are nonetheless present in the snowmobile 10'.

In order to accommodate the inertia wheel 250 and its associated components, the muffler 66 of the snowmobile 10 has been replaced with a smaller muffler 252 disposed on a right side of the engine cradle 20. The muffler 252 is disposed forward of and below the center of the inertia wheel 250. The muffler 252 is connected to the tuned pipe 64 by an exhaust pipe 254. The muffler 252 exhausts exhaust gases under the engine cradle 20.

As can be seen in FIG. 14, the belt transmission system 36 includes a driving pulley 256. The driving pulley 256 is mounted on an output shaft (not shown) of the engine 24. In the present embodiment, the output shaft is coaxial with the crankshaft (not shown) of the engine 24, but it is contemplated that they could be offset from each other. The driving pulley 256 drives a driven pulley 257 (shown in the embodiment of FIG. 19) via a belt 259 (shown in the embodiment of FIG. 19)). The driven pulley and the belt also form part of the belt transmission system 36. The driven pulley is mounted on an end of a laterally extending countershaft 258. The countershaft 258 is disposed rearward of the skis 26. An upper sprocket 260 (FIG. 15) of the reduction drive 25 is mounted on the other end of the countershaft 258. The sprocket 260 drives a lower sprocket (not shown) via a chain (not shown). The upper sprocket 260, lower sprocket and chain are disposed inside a housing of the reduction drive 25. The lower sprocket is mounted on another shaft (not shown) that drives the drive sprockets that drive the endless drive track. The endless drive track 34 of the snowmobile 10 is driven in the same manner.

Figure 15:
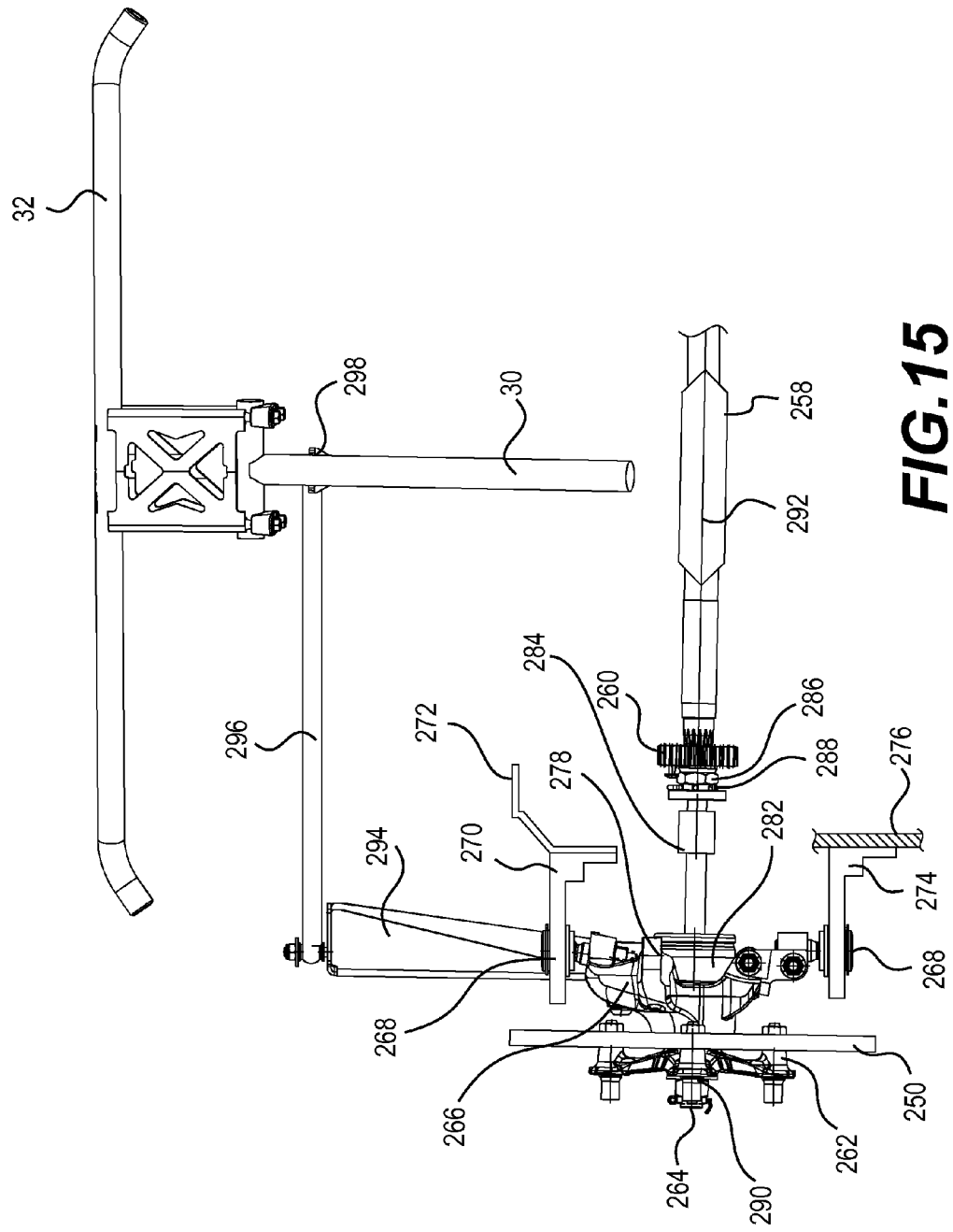
FIG. 15 is a front elevation view of the inertia wheel and associated components of the snowmobile of FIG. 13.
Figure 16:
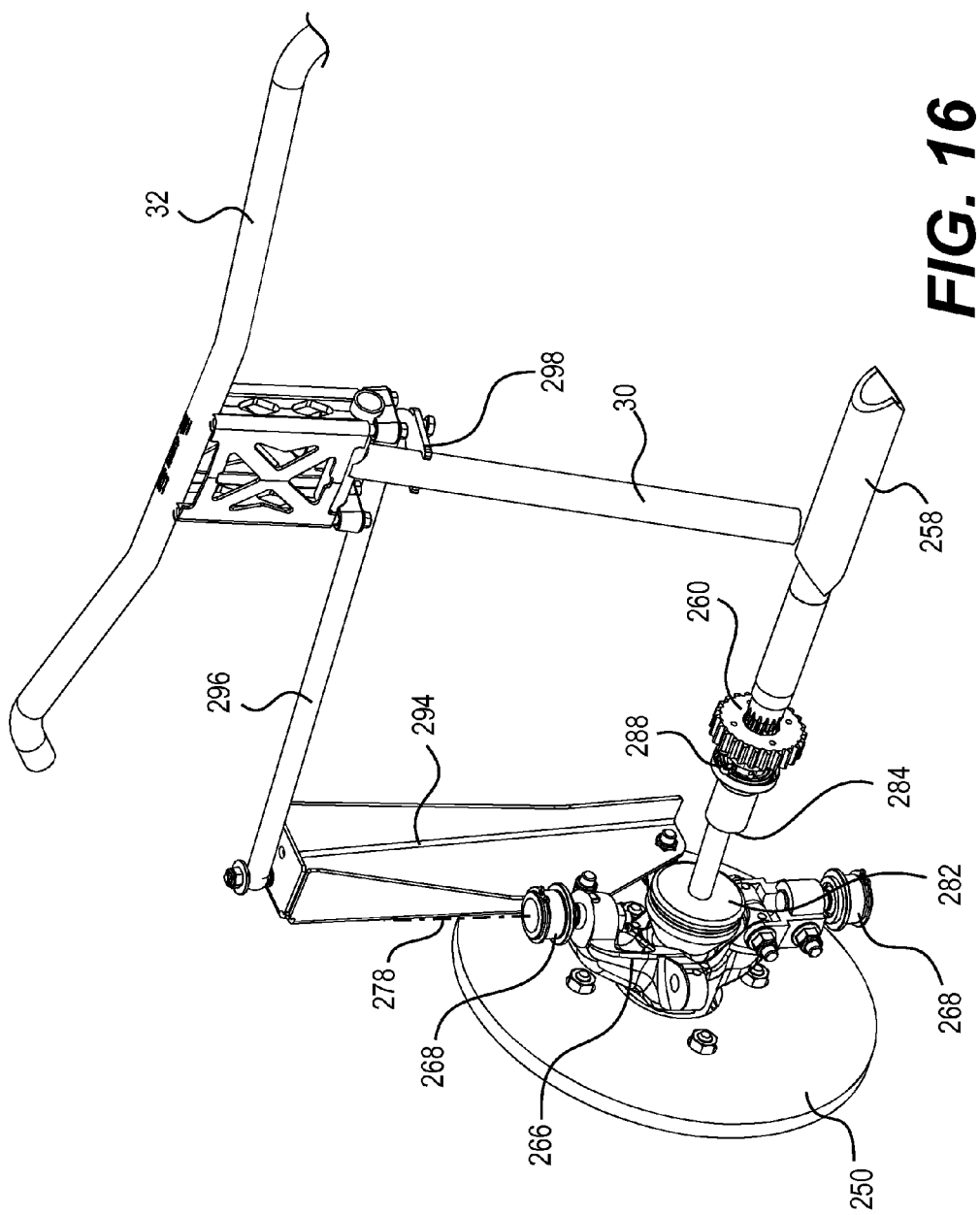
FIG. 16 is a perspective view of the inertia wheel and associated components of FIG. 15 with gimbal support brackets removed for clarity.

The inertia wheel 250 is fastened to a hub 262. The hub 262 is mounted on an axle 264. The axle 264 is rotationally supported inside a gimbal 266 by one or more bearings (not shown). As can be seen in FIGS. 15 and 16, the gimbal 266 is connected between a pair of bearings 268. The upper bearing 268 is connected to a generally L-shaped gimbal support bracket 270. The bracket 270 is connected to a bracket 272 that is connected to a portion of the frame 16. Alternatively, the bracket 270 could be connected to a component of the snowmobile 10' other than the frame 16. It is also contemplated that the bracket 272 could be omitted and that the bracket 270 could be connected directly to the frame 16 or a component of the snowmobile 10' other than the frame 16. The lower bearing 268 is connected to a generally L-shaped gimbal support bracket 274. The bracket 274 is connected to a plate 276 of the frame 16. It is contemplated that bracket 274 could be connected to another portion of the frame 16 or to a component of the snowmobile 10' other than the frame 16. It is also contemplated that the bracket 274 could be connected to another bracket that connects it to its connection point on the snowmobile 10'.

As such, the bearings 268 pivotally support the gimbal 266 about a vertical axis 278. It is contemplated that the axis 278 could be slightly offset from vertical by up to 20 degrees. The gimbal 266 and the inertia wheel 250 pivot together about the axis 278. As can be seen in FIGS. 13 and 14, the gimbal 266 is positioned such that the vertical axis 278 is disposed rearward of the skis 26. In the lateral direction, the vertical axis 278 is disposed between the longitudinal centerline of the snowmobile 10' and the central longitudinal axis 280 (FIG. 14) of the right ski 26 when the snowmobile 10' is steered in a straight ahead direction as in FIG. 14. The axle 264 offsets the inertia wheel 250 from the vertical axis 278. As a result, the inertia wheel 250 is disposed laterally outward of the tunnel 18 and the right footrest 62. As can be seen in FIG. 13, the center of the inertia wheel 250 is located vertically higher than the pivot axis 92 when the snowmobile 10' is upright and steered in a straight ahead direction.

As best seen in FIGS. 15 and 16, a joint 282 is housed partially inside the gimbal 166. The joint 282 is rotationally supported by the gimbal 266 and connects to the axle 264 inside the gimbal 266. In the present embodiment, the joint 282 is a constant velocity joint. However it is contemplated that the joint 282 could be any type of joint that can transmit torque between two shafts that are arranged at an angle to each other. The joint 282 is positioned such that the vertical axis 278 passes through the point about which the joint 282 is articulated such that the inertia wheel 250, the axle 264, the gimbal 266 and a portion of the joint 282 can pivot together about the vertical axis 278. An inertia wheel shaft 284 is connected between the joint 282 and the countershaft 258. As can be seen in FIG. 15, the inertia wheel shaft 284 is disposed laterally between the joint 282 and the sprocket 260. One end of the inertia wheel shaft 284 is received inside the joint 282 and the other end is fastened by a nut 286 over the end of the countershaft 258. A cotter pin 288 prevents the nut 286 from becoming loose during operation. The countershaft 258 drives the inertia wheel 250 via the inertia wheel shaft 284, the joint 282, the axle 264 and the hub 262. The joint 282 permits torque to be transferred from the countershaft 258 to the inertia wheel 250 even when the gimbal 266 pivots about the vertical axis 278. Therefore, when the engine 24 is in operation, the inertia wheel 250 rotates about an inertia wheel axis 290 (FIG. 15). The inertia wheel 250 and the endless drive track 34 both rotate in the same direction (i.e. clockwise with reference to FIG. 13 when the snowmobile 10' is operated to move forward). The inertia wheel axis 290 and the countershaft axis 292 are coaxial when the snowmobile 10' is steered in a straight ahead direction as shown in FIG. 15.

Figure 17:
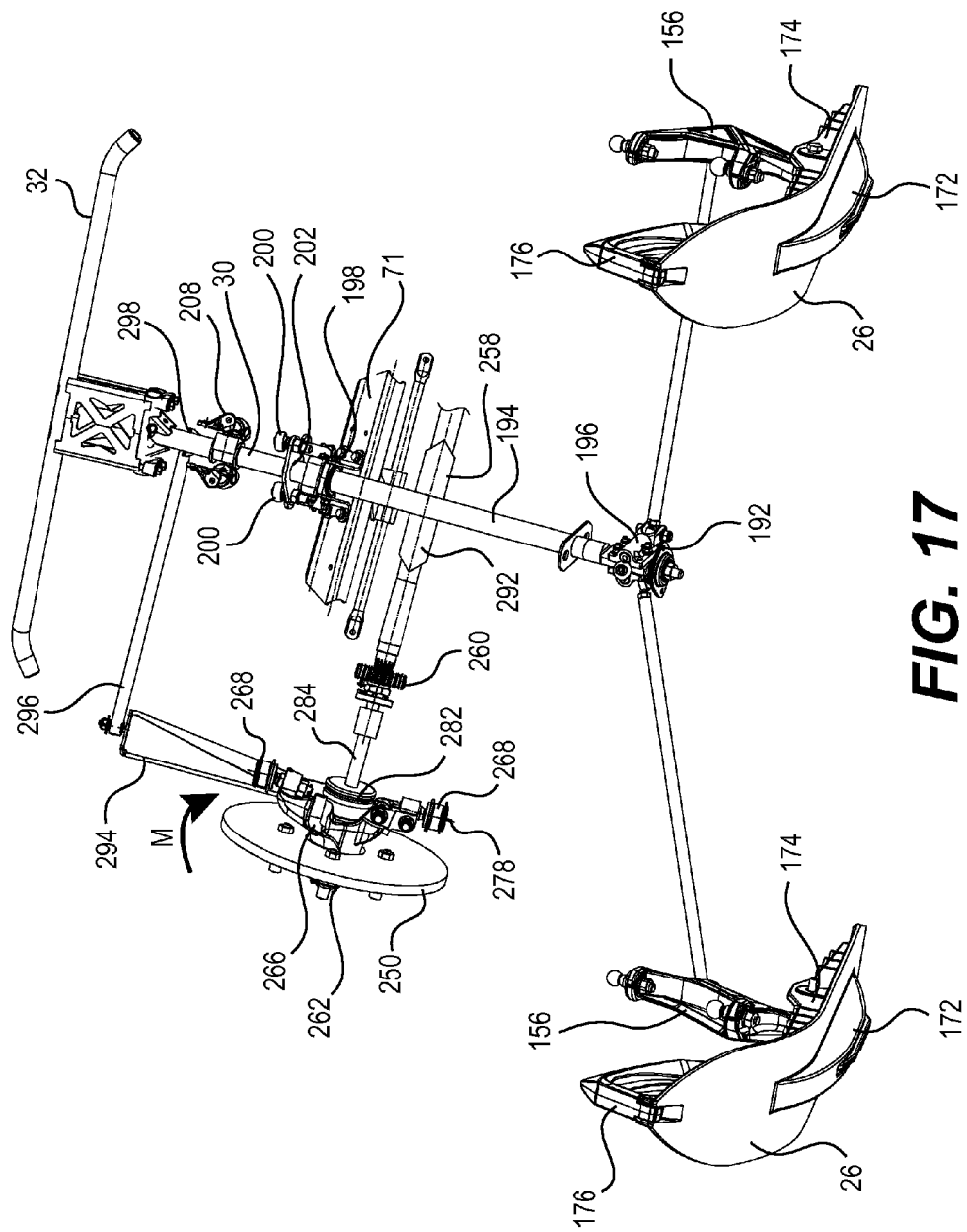
FIG. 17 is a front elevation view of a steering system, inertia wheel and skis of the snowmobile of FIG. 13 shown leaning toward a left side with the handlebar being countersteered toward the right side.
Figure 18:
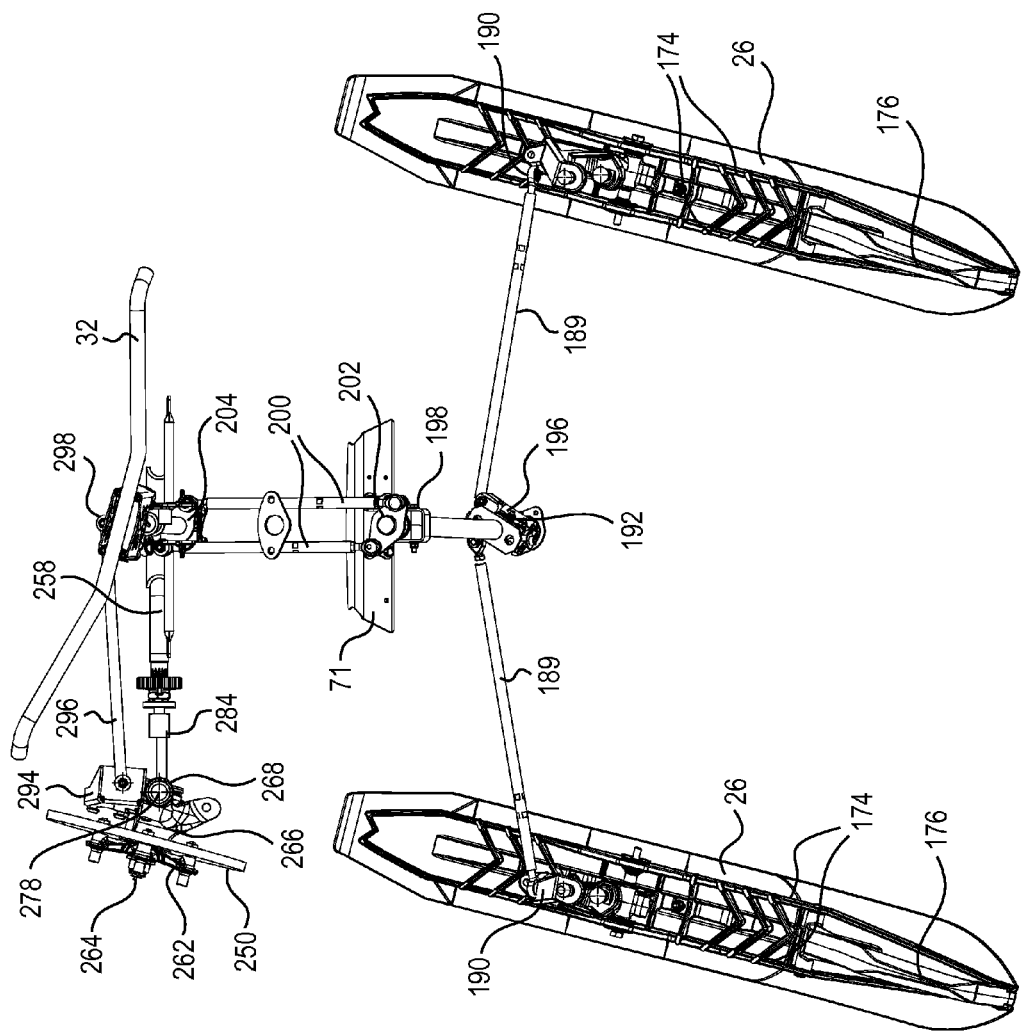
FIG. 18 is a top perspective view of FIG. 17.

A bracket 294 is connected to the gimbal 266 rearward of the vertical pivot axis 278. The bracket 294 extends vertically higher than the inertia wheel 250 and the gimbal 266. A link 296 is pivotally connected at one end about a point on the top of the bracket 294. The other end of the link 296 is pivotally connected about a point on a pitman arm 298 connected to and extending rearward from the steering column 30. Therefore, when the handlebar 32 is turned to steer the skis 26 as described above, the gimbal 266 and the inertia wheel 250 pivot in the same direction. For example, as can be seen in FIGS. 17 and 18, when the handlebar 32 is turned to steer the skis 26 toward the right (i.e. turn clockwise as viewed from above), the gimbal 266 and inertia wheel 250 also pivot toward the right about the axis 278 (i.e. turn clockwise as view from above).

In an alternative embodiment, the bracket 294 is connected to the gimbal 266 forward of the vertical axis 278 and the pitman arm 298 extends forward from the steering column 30 with the link 296 connected therebetween. It is contemplated that the bracket 294 could be omitted to connect the link 296 directly to the gimbal 266 at one end and to a pitman arm 298 disposed lower on the steering column 30 at the other should there be no components of the snowmobile 10' to interfere with the link 296 between the steering column 30 and the gimbal 266. It is contemplated that other mechanisms could be used to pivot the gimbal 266 and the inertia wheel 250 about the axis 278 in response to steering of the handlebar 32. Examples of such mechanisms include, but are not limited to, arrangements of gears, belt and pulleys, and rack and pinion. It is also contemplated that a sensor could be provided to sense rotation of the steering column 30 (or the steering column 194) and that an electrical or hydraulic actuator could pivot the gimbal 266 in response to a signal from the sensor.

As with the snowmobile 10, when the frame 16 is not locked to the shock tower 88, the snowmobile 10' is steered by leaning the frame 16 relative to the shock tower 88 in the direction of the turn. To do this, the driver countersteers by momentarily turning the handlebar 32 in the direction opposite to the turn thereby causing a moment that leans the frame 16 into the turns. In the snowmobile 10', countersteering also causes the inertia wheel 250 to turn about the vertical axis 278. As a result, the inertia wheel 250 creates a moment (moment M in FIG. 17 for leaning into a left turn) about an axis perpendicular to a plane defined by the vertical axis 278 and the inertia wheel axis 290. This moment has a component that creates a moment that assists in leaning the frame 16 into the turn. FIGS. 17 and 18 illustrate countersteering of the snowmobile 10' to take a left turn. As can be seen, the handlebar 32 is steered toward the right of the snowmobile 10', which turns the skis 26 and the inertia wheel 250 toward the right of the snowmobile 10' as shown. The inertia wheel 250 generates a moment M that has a clockwise component (with reference to FIG. 17) that assists in leaning the frame 16 toward the left of the snowmobile 10', thus making the snowmobile 10' turn left. Similarly, by steering the skis 26 in the other direction, the inertia wheel 250 generates a moment in the other direction that has a component that assists in returning the frame 16 to the upright position.

Also, should the frame 16 suddenly lean relative to the shock tower 88, but not as a result of the driver countersteering the snowmobile 10' as described above, the inertia wheel 250 creates a torque on the steering column 30 that turns the handlebar 32 toward the direction of the lean to steer the skis 26 toward the direction of the lean (i.e. toward the right of the snowmobile 10' for the frame 16 leaning right and toward the left of the snowmobile 10' for the frame 16 leaning left) in reaction to which the skis 26 will move in the direction of the lean to displace the snowmobile's contact with the ground in the direction of the lean until it is once again in lateral alignment with the center of gravity of the snowmobile 10' thereby recreating stability. In the case of a loss of lateral traction between the snowmobile 10' and the ground causing the frame 16 to lean, applying a torque to the handlebar 32 in the direction of the lean causes the inertia wheel 250 to create about the center of gravity of the snowmobile 10' that, depending on the magnitude of the torque and the mass of the inertia wheel 250, reduces the leaning of the frame 16, uprights the frame 16, or stops the frame 16 from leaning further.

Figure 19:
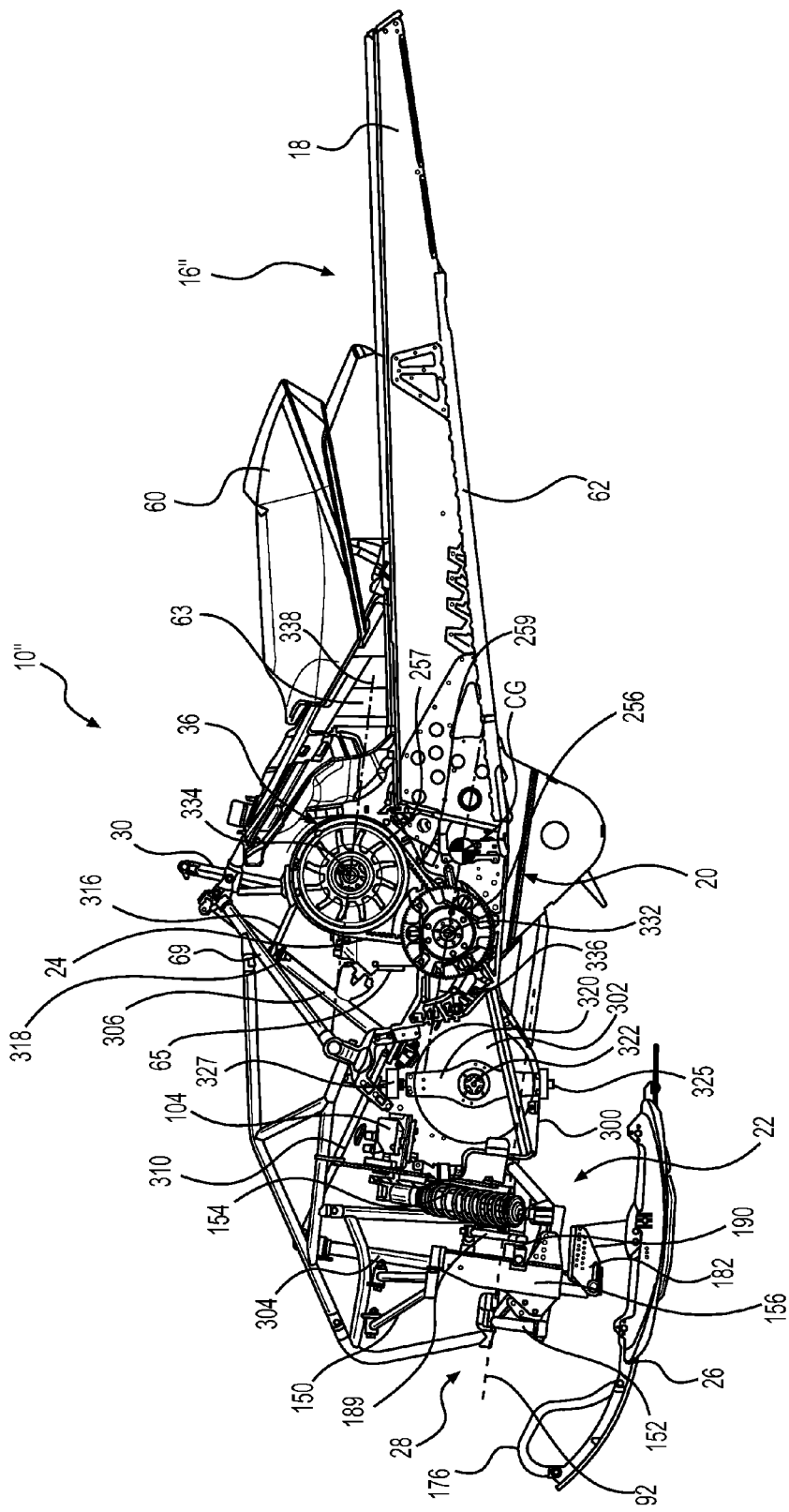
FIG. 19 is a left side elevation view of a frame, front suspension assemblies, and skis of an alternative embodiment of the snowmobile of FIG. 1 having an inertia wheel.
Figure 20:
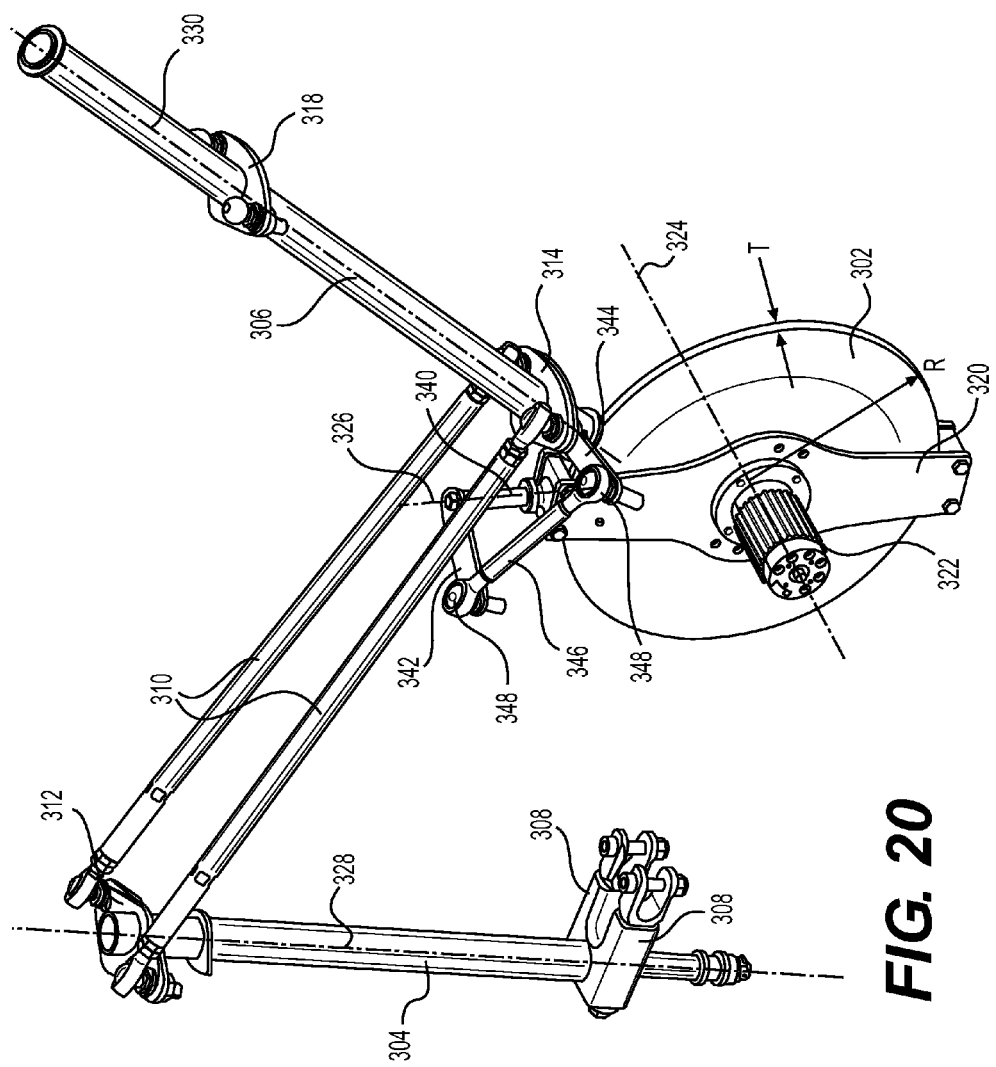
FIG. 20 is a perspective view taken from a rear, left side of the inertia wheel, its associated components and portions of a steering system of the snowmobile of FIG. 19.

Turning now to FIGS. 19 and 20, a snowmobile 10", which is an alternative embodiment of the snowmobiles 10 and 10', will be described. The snowmobile 10" has a frame 16". The frame 16" has a tunnel 18, an engine cradle portion 20 and a front suspension assembly portion 22 that, although not identical, are similar to those described above, and as such will not be described again. The frame 16" also has an extension portion 300 connected longitudinally between the engine cradle portion 20 and the front suspension portion 22. The steering assembly of the snowmobile 10" differs from the steering assembly of the snowmobiles 10 and 10' described above and will be described in detail below. The snowmobile 10" is also provided with an inertia wheel 302 and its associated components which will be described in detail below. The other components of the snowmobile 10", although not necessarily identical, are similar to those of the snowmobiles 10 and 10' described above. Therefore, the components of the snowmobile 10" that are similar to those of the snowmobiles 10 and 10' have been labeled with the same reference numerals as in the figures and will not be described again in detail herein.

The steering assembly of the snowmobile 10" has three steering columns 30, 304 and 306. A handlebar (not shown in this embodiment, but similar to the handlebar 32) is connected to the top of the steering column 30. To steer the skis 26, each ski leg 156 is connected to a steering rod 189 via a ball joint 190 connected to the back of the ski leg 156. The proximal ends of the steering rods 189 are connected to a pitman arms 308 (FIG. 20) connected to the lower portion of the steering column 304. The steering column 304 is connected to the frame 16" in front of the shock absorbers 154 by lower and upper brackets (not shown) inside which it can pivot. As best seen in FIG. 20, a pair of connecting rods 310 having ball joints at both ends is connected between a flange 312 at a top of the steering column 304 and a flange 314 near a bottom of the steering column 306, thereby transmitting steering motion between the steering columns 306 and 304. The steering column 306 is connected to the frame 16" rearward of the steering column 304 by lower and upper brackets (not shown) inside which it can pivot. The steering column 306 extends through the generally triangular surface area defined by the cross bar 67 and left and right frame members 69. As can be seen in FIG. 19, a pair of connecting rods 316 having ball joints at both ends is connected between a flange 318 above a center of the steering column 306 and a flange (not shown, but similar to the flange 204 described above) near a bottom of the steering column 30, thereby transmitting steering motion between the steering columns 30 and 306. The steering column 30 is connected to the frame 16" rearward of the steering column 306 by lower and upper brackets (not shown) inside which it can pivot. As a result of this arrangement, when the handlebar, which is connected to the steering column 30, is turned in one direction, the skis 26 are turned in the same direction. It is contemplated that the steering columns 30, 304 and 306 could be replaced by a single steering column, two steering columns or more than three steering columns. It is also contemplated that the snowmobile 10" could be provided with a power steering system where an actuator, such as an electric motor or a hydraulic actuator, moves the steering rods 189 to steer the skis 26.

The inertia wheel 302 is rotationally supported inside a gimbal 320. As can be seen in FIG. 20, the inertia wheel 302 has a radius R and a thickness T. In an exemplary embodiment, the radius R is between 10 and 17.5 cm and the thickness T is between 4 and 10 mm. In an exemplary embodiment, the inertia wheel 302 is made of metal such as steel and has a mass between 1 and 7 kg. In order to create a large gyroscopic effect, the radius R of the inertia wheel 302 is selected to be as large as possible within the other physical constraints of the snowmobile 10" while having a thickness T and using a material that keep the mass M to a minimum. An electric motor 322 is mounted to a left side of the gimbal 320. A shaft (not shown) passes through a center of the inertia wheel 302 and connects to the output shaft (not shown) of the electric motor 322. The shaft and the inertia wheel 302 are connected together, by splines for example, so as to be rotationally fixed relative to each other. The electric motor 322, when powered, causes the inertia wheel 302 to turn inside the gimbal about an inertia wheel axis 324. The shaft passing through the center of the inertia wheel 302 is supported by bearings (not shown) in the gimbal 320. In the present embodiment, the shaft passing through the center of the inertia wheel 302 is coaxial with the output shaft of the electric motor 322. It is contemplated that the output shaft of the electric motor 322 could be offset from the shaft of the inertia wheel 302 and that a transmission system, such as gears, a chain and sprocket assembly, or a belt and pulleys assembly, could be used to transmit rotation of the output shaft of the electric motor 322 to the shaft of the inertia wheel 302.

As with the gimbal 266 described above, the gimbal 320 is connected between a pair of bearings (not shown) connected to lower and upper brackets 325, 327 (FIG. 19). The brackets 325, 327 are connected to a portion of the frame 16". Alternatively, the brackets 325, 327 could be connected to a component of the snowmobile 10" other than the frame 16". As such, the bearings pivotally support the gimbal 320 about a vertical axis 326 (FIG. 20). It is contemplated that the axis 326 could be slightly offset from vertical by up to 20 degrees. The gimbal 320, the inertia wheel 302 and the electric motor 322 pivot together about the axis 326. As can be seen in FIG. 19, the gimbal 320 is positioned in the extension portion 300 of the frame 16" such that the inertia wheel 302 is disposed rearward of the front suspension assemblies 28 and forward of the engine 24 and the CVT 36. The vertical axis 326 is laterally centered in the snowmobile 10" and, as a result, intersects the longitudinal centerline of the snowmobile 10". The vertical axis 326 is disposed in a vertical plane containing the longitudinal centerline of the snowmobile 10" when the snowmobile 10" is upright and steered in a straight ahead direction. The rotation axes 328 and 330 of the steering columns 304 and 306 respectively are also contained in a plane containing the vertical axis 326 and the longitudinal centerline of the snowmobile 10". It is contemplated that the vertical axis 326 could be laterally offset from the longitudinal centerline of the snowmobile 10". The vertical axis 326 is perpendicular to the axis of rotation 332 of the driving pulley 256, the axis of rotation of the crankshaft (not shown but coaxial with the axis 332) and the axis of rotation 334 of the driven pulley 257. As can be seen in FIG. 19, the center of the inertia wheel 302 is located vertically higher than the pivot axis 92 when the snowmobile 10" is upright and steered in a straight ahead direction. When the snowmobile 10" is steered in a straight ahead direction, the inertia wheel axis 324 is parallel to the axis of rotation 332 of the driving pulley 256, the axis of rotation of the crankshaft and the axis of rotation 334 of the driven pulley 257. The center of the inertia wheel 302 is located vertically lower than the axis of rotation 332 of the driving pulley 256 and the axis of rotation 334 of the driven pulley 257. The center of the inertia wheel 302 is located vertically between the pivot axis 92 and a line 336 that is parallel to the pivot axis 92 and passes through the axis of rotation 332 of the driving pulley 256. The center of the inertia wheel 302 is therefore also located vertically between the pivot axis 92 and a line 338 that is parallel to the pivot axis 92 and passes through the axis of rotation 334 of the driven pulley 257. FIG. 19 shown the location of the center of gravity CG of the snowmobile 10" when the snowmobile 10" is upright, steered in a straight ahead direction and full of operational fluids (i.e. a fuel tank full of fuel, and oil tank full of oil, etc.). As can be seen in FIG. 19, the center of gravity CG and the center of the inertia wheel 302 are at approximately the same height. In an exemplary embodiment, the vertical distance between the center of gravity CG and the center of the inertia wheel 302 is less than or equal to the radius R of the inertia wheel 302.

As described above, the electric motor 322 is mounted to the gimbal 320 and as such rotates about the pivot axis 326 with the gimbal 320 and the inertia wheel 302. It is contemplated that the electric motor 322 could be mounted to another portion of the snowmobile 10" so as to not rotate about the pivot axis 326. In such an embodiment, one or more joints that can transmit torque between two shafts that are arranged at an angle to each other and, if necessary, one or more shafts could be used to connect the output shaft of the electric motor 322 to the shaft of the inertia wheel 302. When the engine 24 is in operation, the inertia wheel 302 rotates about the inertia wheel axis 324. When the snowmobile 10" is in operation, the electric motor 322 rotates the inertia wheel 302 in the same direction as the endless drive track 34 (i.e. counter-clockwise with reference to FIG. 19 when the snowmobile 10' is operated to move forward). The speed of rotation of the electric motor 322 and therefore of the inertia wheel 302 is controlled by a control unit (not shown). The control unit receives a signal from a speed sensor sensing a speed of the snowmobile 10". The speed of rotation of the inertia wheel 302 is controlled so as to increase as the speed of the snowmobile 10" decreases. As such, when the snowmobile 10" is operated at low speeds, the speed of rotation of the inertia wheel 302 is greater than when the snowmobile 10" is operated at high speeds. The control unit also causes the electric motor 322 to stop operating, and therefore stops the rotation of the inertia wheel 302, when the locking mechanism 104 locks the frame 16" in the upright position and also when the engine 24 stops operating. It is contemplated that the inertia wheel 302 could be rotated at a constant speed regardless of the speed of the snowmobile 10". It is also contemplated that other factors, such as acceleration of the snowmobile 10" and engine speed for example, could be used to determine a speed of rotation of the inertia wheel 302.

A shaft 340 is fixed to the top of the gimbal 320. A link 342 is fixedly connected to the top of the shaft 340 and extends toward the left from the shaft 340. Another link 344 is fixedly connected to the flange 314 and extends toward the left from the flange 314. A connecting rod 346 having ball joints 348 at both ends connects the left end of the link 342 to the left end of the link 344. Therefore, when the handlebar is turned to steer the skis 26 as described above, the gimbal 320, the electric motor 322 and the inertia wheel 302 pivot in the same direction. For example, when the handlebar is turned to steer the skis 26 toward the right (i.e. turn clockwise as viewed from above), the gimbal 320, the electric motor 322 and the inertia wheel 302 also pivot toward the right about the axis 326 (i.e. turn clockwise as view from above).

It is contemplated that the links 342, 344 and the connecting rod 346 could alternatively be disposed on a right side of the axis 326. It is also contemplated that other mechanisms could be used to pivot the gimbal 320, the electric motor 322 and the inertia wheel 302 about the axis 326 in response to steering of the handlebar. Examples of such mechanisms include, but are not limited to, arrangements of gears, belt and pulleys, and rack and pinion. It is also contemplated that a sensor could be provided to sense rotation of the steering column 30 (or the steering column 304 or 306) and that an electrical or hydraulic actuator could pivot the gimbal 320 in response to a signal from the sensor.

Modifications and improvements to the above-described embodiments of the present may become apparent to those skilled in the art. The foregoing description is intended to be exemplary rather than limiting. The scope of the present is therefore intended to be limited solely by the scope of the appended claims.

What is claimed is:

1. A vehicle comprising:
   a frame having a front portion and a rear portion;
   a straddle seat mounted on the frame;
   a motor supported by the frame;
   a belt transmission system operatively connected to and driven by the motor;
   a front left suspension assembly and a front right suspension assembly operatively connected to the front portion of the frame;
   a front left ground engaging member operatively connected to the front left suspension assembly;
   a front right ground engaging member operatively connected to the front right suspension assembly;
   a rear suspension assembly connected to the rear portion of the frame;
   a rear ground engaging member operatively connected to the rear suspension assembly,
   at least one of the ground engaging members being driven by the belt transmission system;
   a steering assembly operatively connected to the front left ground engaging member and the front right ground engaging member to steer the vehicle, the steering assembly having a steering column supported by the frame and a handlebar connected to the steering column; and
   an inertia wheel operatively connected to the steering assembly, the inertia wheel pivoting about a generally vertical axis when the handlebar is turned to steer the front left and right ground engaging members, the inertia wheel pivoting about the vertical axis in a same direction as the front left and right ground engaging members when steered by the handlebar.

2. The vehicle of claim 1, further comprising a link operatively connecting the steering column to the inertia wheel.

3. The vehicle of claim 2, wherein the link is operatively connected at a first end to the steering column about a first point that is offset from a steering column axis defined by the steering column; and
   wherein the link is operatively connected at a second end to the inertia wheel about a second point that is offset from the vertical axis.

4. The vehicle of claim 2, wherein the link has a first end and a second end, the first end of the link being operatively connected to the steering column about a first point that is offset from a steering column axis defined by the steering column, and the second end of the link being operatively connected to the inertia wheel about a second point that is offset from the vertical axis;
   the vehicle further comprising:
   a joint operatively connected to the belt transmission system;
   an axle connecting the joint to the inertia wheel; and a gimbal rotationally supporting the axle and the joint therein, the gimbal being pivotable about the vertical axis together with the inertia wheel, the gimbal being connected to the second end of the link.

5. The vehicle of claim 1, wherein the inertia wheel and the rear ground engaging member rotate in a same direction when the vehicle is in operation.

6. The vehicle of claim 1, wherein the frame is pivotable about a longitudinally extending pivot axis; and
   wherein a center of the inertia wheel is vertically higher than the pivot axis at least when the vehicle is in an upright position.

7. The vehicle of claim 1, further comprising a shock tower pivotally connected to the front portion of the frame, the frame being pivotable relative to the shock tower about a pivot axis between an upright position and a plurality of leaning positions;
   wherein each of the front left suspension assembly and the front right suspension assembly includes a shock absorber connected at one end to the shock tower.

8. The vehicle of claim 1, further comprising:
   a laterally extending countershaft operatively connected to and driven by the belt transmission system; and
   a reduction drive operatively connected to and driven by the countershaft;
   wherein the inertia wheel rotates about an inertia wheel axis and the countershaft rotates about a countershaft axis; and
   wherein the inertia wheel axis and the countershaft axis are coaxial when the vehicle is steered in a straight ahead direction.

9. The vehicle of claim 1, wherein the vertical axis is disposed in a vertical plane containing a longitudinal centerline of the vehicle when the vehicle is steered in a straight ahead direction.

10. The vehicle of claim 1, wherein the vehicle is a snowmobile; and
    wherein:
    the rear portion of the frame includes a tunnel;
    the front left ground engaging member is a left ski;
    the front right ground engaging member is a right ski; and
    the rear ground engaging member is an endless track disposed at least in part under the tunnel.

11. The vehicle of claim 10, wherein the endless drive track has a generally arcuate lateral profile.

12. The vehicle of claim 1, further comprising an electric motor operatively connected to the inertia wheel and driving the inertia wheel.

13. The vehicle of claim 1, wherein the inertial wheel is operatively connected to and driven by the belt transmission system.

14. A vehicle comprising:
    a frame having a front portion and a rear portion;
    a straddle seat mounted on the frame;
    a motor supported by the frame;
    a belt transmission system operatively connected to and driven by the motor;
    a front left suspension assembly and a front right suspension assembly operatively connected to the front portion of the frame;
    a front left ground engaging member operatively connected to the front left suspension assembly;
    a front right ground engaging member operatively connected to the front right suspension assembly;

a rear suspension assembly connected to the rear portion of the frame;

a rear ground engaging member operatively connected to the rear suspension assembly, at least one of the ground engaging members being driven by the belt transmission system;

a steering assembly operatively connected to the front left ground engaging member and the front right ground engaging member to steer the vehicle, the steering assembly having a steering column supported by the frame and a handlebar connected to the steering column; and an inertia wheel operatively connected to the steering assembly, the inertia wheel pivoting about an inertia wheel pivot axis when the handlebar is turned to steer the front left and right ground engaging members, the inertia wheel pivoting about the inertia wheel pivot axis in a same direction as the front left and right ground engaging members when steered by the handlebar.

15. The vehicle of claim 14, further comprising a link operatively connecting the steering column to the inertia wheel.

16. The vehicle of claim 15, wherein the link is operatively connected at a first end to the steering column about a first point that is offset from a steering column axis defined by the steering column; and wherein the link is operatively connected at a second end to the inertia wheel about a second point that is offset from the inertia wheel pivot axis.

17. The vehicle of claim 15, wherein the link has a first end and a second end, the first end of the link being operatively connected to the steering column about a first point that is offset from a steering column axis defined by the steering column, and the second end of the link being operatively connected to the inertia wheel about a second point that is offset from the inertia wheel pivot axis;

the vehicle further comprising:

a joint operatively connected to the belt transmission system;

an axle connecting the joint to the inertia wheel; and a gimbal rotationally supporting the axle and the joint therein, the gimbal being pivotable about the inertia wheel pivot axis together with the inertia wheel, the gimbal being connected to the second end of the link.

18. The vehicle of claim 14, wherein the inertia wheel and the rear ground engaging member rotate in a same direction when the vehicle is in operation.

19. The vehicle of claim 14, wherein the frame is pivotable about a longitudinally extending pivot axis; and wherein a center of the inertia wheel is vertically higher than the longitudinally extending pivot axis at least when the vehicle is in an upright position.

20. The vehicle of claim 14, further comprising a shock tower pivotally connected to the front portion of the frame, the frame being pivotable relative to the shock tower about a pivot axis between an upright position and a plurality of leaning positions;

wherein each of the front left suspension assembly and the front right suspension assembly includes a shock absorber connected at one end to the shock tower.

* * * * *